US010873461B2

United States Patent
Gupta et al.

(10) Patent No.: US 10,873,461 B2
(45) Date of Patent: Dec. 22, 2020

(54) ZERO-KNOWLEDGE MULTIPARTY SECURE SHARING OF VOICEPRINTS

(71) Applicant: PINDROP SECURITY, INC., Atlanta, GA (US)

(72) Inventors: Payas Gupta, Atlanta, GA (US); Terry Nelms, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 164 days.

(21) Appl. No.: 16/035,301

(22) Filed: Jul. 13, 2018

(65) Prior Publication Data

US 2019/0020482 A1 Jan. 17, 2019

Related U.S. Application Data

(60) Provisional application No. 62/532,218, filed on Jul. 13, 2017.

(51) Int. Cl.
*H04L 9/32* (2006.01)
*G10L 17/06* (2013.01)
(Continued)

(52) U.S. Cl.
CPC ............ *H04L 9/3231* (2013.01); *G10L 17/06* (2013.01); *G10L 17/22* (2013.01); *H04L 9/0841* (2013.01);
(Continued)

(58) Field of Classification Search
CPC ....... G10L 17/06; G10L 17/22; H04L 9/0841; H04L 9/0869; H04L 9/3013;
(Continued)

(56) References Cited

U.S. PATENT DOCUMENTS 7,668,718 B2    2/2010  Kahn et al.
8,160,877 B1 *  4/2012  Nucci .................... G10L 17/06
                                                            704/246
(Continued)

FOREIGN PATENT DOCUMENTS

FR    3010214 A1    3/2015
FR    3023115 A1    1/2016
(Continued)

OTHER PUBLICATIONS

Kikuchi, H. et al. Privacy-preserving similarity evaluation and application to remote biometrics authentication. Soft Comput 14, 529-513 (2010) doi:10.1007/s00500-009-0449-6 (Year: 2010).*
(Continued)

*Primary Examiner* — Mahfuzur Rahman
*Assistant Examiner* — Richard W Cruz-Franqui
(74) *Attorney, Agent, or Firm* — Foley & Lardner LLP

(57) ABSTRACT

Disclosed herein are embodiments of systems and methods for zero-knowledge multiparty secure sharing of voiceprints. In an embodiment, an illustrative computer may receive, through a remote server, a plurality of encrypted voiceprints. When the computer receives an incoming call, the computer may generate a plaintext i-vector of the incoming call. Using the plaintext i-vector and the encrypted voiceprints, the computer may generate one or more encrypted comparison models. The remote server may decrypt the encrypted comparison model to generate similarity scores between the plaintext i-vector and the plurality of encrypted voiceprints.

20 Claims, 7 Drawing Sheets

(51) Int. Cl.
　　　*G10L 17/22*　　(2013.01)
　　　*H04L 9/08*　　(2006.01)
　　　*H04L 9/30*　　(2006.01)
(52) U.S. Cl.
　　　CPC .......... *H04L 9/0869* (2013.01); *H04L 9/3013* (2013.01); *H04L 9/3066* (2013.01); *H04L 9/3218* (2013.01)
(58) Field of Classification Search
　　　CPC ... H04L 9/3066; H04L 9/3231; H04L 9/3218; G06F 17/5036; G06F 17/5068
　　　See application file for complete search history.

(56) References Cited

U.S. PATENT DOCUMENTS

| | | | |
|---|---|---|---|
| 8,676,579 | B2 | 3/2014 | Hymel |
| 8,769,643 | B1 | 7/2014 | Ben Ayed |
| 9,113,240 | B2 | 8/2015 | Ramakrishnan et al. |
| 9,236,052 | B2 | 1/2016 | Timem et al. |
| 9,384,751 | B2 | 7/2016 | Venkatesha et al. |
| 9,430,625 | B1 | 8/2016 | Gador et al. |
| 9,608,970 | B1 | 3/2017 | Gehret et al. |
| 9,654,469 | B1 | 5/2017 | Yang |
| 9,697,822 | B1 | 7/2017 | Naik et al. |
| 9,843,583 | B2 | 12/2017 | Holz |
| 9,881,616 | B2 | 1/2018 | Beckley et al. |
| 9,892,732 | B1 | 2/2018 | Tian et al. |
| 9,967,432 | B2 | 5/2018 | Numakura |
| 10,027,662 | B1 | 7/2018 | Mutagi et al. |
| 10,063,542 | B1 | 8/2018 | Kao |
| 10,068,421 | B2 | 9/2018 | Alderucci |
| 2005/0071168 | A1 | 3/2005 | Juang et al. |
| 2006/0218621 | A1 | 9/2006 | Covington et al. |
| 2009/0006855 | A1* | 1/2009 | Tuyls ................. H04L 9/008 713/182 |
| 2009/0279694 | A1* | 11/2009 | Takahashi ............. G06F 7/00 380/28 |
| 2011/0219427 | A1 | 9/2011 | Hito et al. |
| 2012/0314911 | A1* | 12/2012 | Paul ................. G06F 21/32 382/115 |
| 2013/0063126 | A1 | 3/2013 | Cong et al. |
| 2013/0174243 | A1 | 7/2013 | Inatomi et al. |
| 2013/0176826 | A1 | 7/2013 | Li |
| 2013/0318351 | A1* | 11/2013 | Hirano ............... H04L 9/3231 713/168 |
| 2014/0046664 | A1 | 2/2014 | Sarkar et al. |
| 2014/0164244 | A1 | 6/2014 | Wilson |
| 2014/0247939 | A1* | 9/2014 | Hattori ................. H04L 9/30 380/44 |
| 2015/0082390 | A1* | 3/2015 | Flink ................. H04L 63/0861 726/4 |
| 2015/0178581 | A1* | 6/2015 | Aoki ................. G06K 9/00087 382/115 |
| 2015/0215299 | A1 | 7/2015 | Burch et al. |
| 2015/0222601 | A1 | 8/2015 | Metz et al. |
| 2015/0234624 | A1 | 8/2015 | Nii et al. |
| 2016/0119119 | A1* | 4/2016 | Calapodescu ....... G06F 21/6227 380/30 |
| 2016/0234206 | A1 | 8/2016 | Tunnell et al. |
| 2016/0269174 | A1* | 9/2016 | Yasuda ................. H04L 9/008 |
| 2016/0283681 | A1 | 9/2016 | Falck et al. |
| 2017/0006028 | A1 | 1/2017 | Tunnell et al. |
| 2017/0011406 | A1 | 1/2017 | Tunnell et al. |
| 2017/0026380 | A1 | 1/2017 | Liebl, III et al. |
| 2017/0053108 | A1* | 2/2017 | Jakobsson ............ H04L 63/10 |
| 2017/0085382 | A1* | 3/2017 | Kamakari ............ H04L 63/06 |
| 2017/0161480 | A1* | 6/2017 | Jo ..................... G06F 21/32 |
| 2017/0330563 | A1 | 11/2017 | Daley et al. |
| 2017/0331807 | A1 | 11/2017 | Mont-Reynaud et al. |
| 2018/0014197 | A1 | 1/2018 | Arana |
| 2018/0018964 | A1 | 1/2018 | Reilly et al. |
| 2018/0039768 | A1 | 2/2018 | Roberts et al. |
| 2018/0047386 | A1 | 2/2018 | Garner et al. |
| 2018/0054312 | A1* | 2/2018 | Kamal ................. H04L 9/3231 |
| 2018/0063126 | A1 | 3/2018 | Karapantelakis et al. |
| 2018/0069854 | A1 | 3/2018 | Chakraborty et al. |
| 2018/0145825 | A1* | 5/2018 | Isshiki ................. H04L 9/008 |
| 2018/0219677 | A1* | 8/2018 | Nair ................... H04L 9/0825 |
| 2019/0020482 | A1* | 1/2019 | Gupta ................. H04L 9/0841 |
| 2019/0372970 | A1* | 12/2019 | Yan .................... G10L 17/04 |
| 2019/0394039 | A1* | 12/2019 | Higo ................... H04L 9/3066 |

FOREIGN PATENT DOCUMENTS

| | | |
|---|---|---|
| FR | 3047583 A1 | 8/2017 |
| FR | 3048145 A1 | 8/2017 |
| FR | 3052614 A1 | 12/2017 |
| WO | 2014063363 A1 | 5/2014 |
| WO | 2015033061 A1 | 3/2015 |
| WO | 2016060999 A1 | 4/2016 |
| WO | 2016141972 A1 | 9/2016 |

OTHER PUBLICATIONS

Gomez-Barrero, M. et al. (2017). Muilti-biometric template protection based on homomorphic encryption. Pattern Recognition, 67 (2017), pp. 149-163. (Year: 2017).*
Yingkai, M. and Jia, C. (2014). A kind of identity authentication under cloud computing environment. 2014 7th International Conference in Intelligent Computation Technology and Automation, pp. 12-15. (Year: 2014).*
Zhu, H. and He, Q. (2011). Voiceprint-biometric template design and authentication based on cloud computing security. 2011 International Conference on Cliud and Service Computing, pp. 302-308. (Year: 2011).*
Yingkai et al., A Kind of Identity Authentication under Cloud Computing Environment (Year: 2014).*
NPL Search (Google Scholar) (Year: 2020).*
Zhang et al., VoiceLive: A Phoneme Localization Based Liveness Detection for Voice Authentication on Smartphones, retrieved from the Internet: http://ww2.cs.fsu.edu/~tan/paper/ccs2016.pdf. CCS'16, Oct. 24-28, 2016, Vienna, Austria, 12 pages.
Karapanos et al., Sound-Proof: Usable Two-Factor Authentication Based on Ambient Sound, USENIX Security Symposium, retrieved from: https://www.usenix.org/system/files/conference/usenixsecurity15/sec15-paper-paper-karapanos.pdf, Aug. 14, 2015, 17 pages.
Notification of Transmittal of the International Search Report and the Written Opinion of the International Searching Authority, dated May 3, 2019, in corresponding International Application No. PCT/US2019/019349 14 pages.
Notification of Transmittal of the International Search Report and the Written Opinion of the International Searching Authority, dated May 3, 2019, in corresponding International Application No. PCT/US2019/019353, 13 pages.
Notification of Transmittal of the International Search Report and the Written Opinion of the International Searching Authority, dated Aug. 27, 2018, issued in corresponding International Application No. PCT/US2-018/041779, 14 pages.
Hua-Hong Zhu et al., "Voiceprint-biometric template design and authentication based on cloud computing security", Cloud and Service Computing (CSC), 2011 International Conference on, IEEE, Dec. 12, 2011, pp. 302-308, XP032102717.
Yingkai Miao et al., "A Kind of Identity Authentication Under Cloud Computing Environment", 2014 7th International Conference on Intelligent Computation Technology and Automation, IEEE, Oct. 25, 2014, pp. 12-15, XP032717006.

* cited by examiner

100

ZERO-KNOWLEDGE MULTIPARTY SECURE SHARING OF VOICEPRINTS

CROSS REFERENCE TO RELATED APPLICATIONS

This application claims priority to U.S. Provisional Application No. 62/532,218, filed Jul. 13, 2017, which is hereby incorporated by reference in its entirety.

TECHNICAL FIELD

This application relates generally to multiparty secure sharing of voiceprints for authentication, and more specifically to sharing of encrypted voiceprints and calculating similarity scores between encrypted voiceprints, wherein each party does not have access to plaintext voiceprints of the other parties.

BACKGROUND

A voiceprint may be represented by a feature vector, such as an n-dimensional i-vector. The feature vector, i.e., the voiceprint, may store various features of a speaker and can be used to identify the speaker based upon a comparison score. For example, a computer may store a plurality of voiceprints for a plurality of corresponding speakers and upon receipt of a new voice sample (from a phone call, for example) of purportedly known speaker, the computer may generate a voiceprint of the new voice sample and compare the voiceprint with the corresponding stored voiceprints. If a comparison score generated by a comparing operation is above threshold, the computer may authenticate the speaker.

However, the plaintext i-vectors, i.e., the unencrypted voiceprints, may be maliciously accessed by attackers at storage and/or during transit. If a server holds plaintext i-vectors, an attacker may simply download those plaintext i-vectors and present the maliciously downloaded plaintext i-vectors for authentication. If plaintext i-vectors are used in transit, an attacker may simply tap into the communications channel to copy the plaintext i-vectors in transit and use the copied i-vectors maliciously.

Furthermore, while multiple parties are involved in voice communications using voiceprints to authenticate each other; the actual, unencrypted voiceprint(s) of a party has to be shielded from other parties. In other words, privacy of voiceprints has to be preserved across multiple communicating parties. So, each party should have a zero-knowledge of the voiceprints of the other parties. However, for comparison of voiceprints, the communicating parties should have access to the voiceprints of the other parties in some form.

Conventional technology does not provide the functionality of zero-knowledge sharing and comparison of voiceprints.

SUMMARY

What is therefore desired are systems and methods for zero-knowledge secure sharing, comparison, and updating of voiceprints. More specifically, a significant improvement in the existing voiceprint sharing technology is required that allows for parties to calculate similarity scores between encrypted voiceprints without having an actual knowledge of the unencrypted, plaintext voiceprints.

In one embodiment, a computer implemented method comprises: receiving, by a computer from a first client computer, an encrypted voiceprint model and an encrypted random number, wherein the random number is encrypted using a public key of the computer; decrypting, by the computer, the random number using a private key of the computer; transmitting, by the computer, the encrypted voiceprint model to a second client computer; receiving, by the computer, one or more encrypted comparison models generated by the second client computer based upon comparing the encrypted voiceprint model and a plaintext voiceprint; determining, by the computer, a similarity score between the encrypted voiceprint model and the plaintext voiceprint using the random number on the one or more encrypted comparison models; and transmitting, by the computer, the similarity score to the second client computer to authenticate a speaker of a voice associated with plaintext voiceprint or to identify a fraudulent caller.

In another embodiment, a computer implemented method comprises: receiving, by a first computer from a third party server, an encrypted voiceprint model associated with a second computer and a random number encrypted using a public key of the first computer; decrypting, by the first computer, the random number using a private key of the first computer; extracting, by the first computer, a plaintext voiceprint from an audio; generating, by the first computer, one or more encrypted comparison models based upon the encrypted voiceprint model, the plaintext voiceprint, and the random number; transmitting, by the first computer, the one or more encrypted comparison models to the third party server; receiving, by the first computer from the third party server, a similarity score between the encrypted voiceprint model and the plaintext voiceprint; and detecting, by the first computer, a speaker in the audio based on the similarity score.

In yet another embodiment, a system comprises: a non-transitory storage medium configured to store a plurality of encrypted voiceprint models and a lookup table for encrypted similarity scores and corresponding plaintext similarity scores; a processor coupled to the non-transitory storage medium and configured to: receive from a first client computer, an encrypted voiceprint model and an encrypted random number, wherein the random number is encrypted using a public key of the computer; decrypt the random number using a private key of the computer; transmit the encrypted voiceprint model to a second client computer; receive one or more encrypted comparison models generated by the second computer based upon comparing the encrypted voiceprint model and a plaintext voiceprint; determining, by the computer, an encrypted similarity score between the encrypted voiceprint model and the plaintext voiceprint using the random number on the one or more encrypted comparison models; and retrieving, by the computer, from the lookup table in the non-transitory storage medium a plaintext similarity score corresponding to the encrypted similarity score.

BRIEF DESCRIPTION OF THE DRAWINGS

The accompanying drawings constitute a part of this specification and illustrate embodiments of the subject matter disclosed herein.

DETAILED DESCRIPTION

Figure 1:
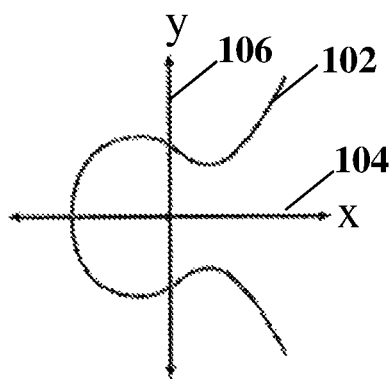
FIG. 1 shows a graph for elliptical curve cryptography, according an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Embodiments disclosed herein describe systems and methods for zero-knowledge multiparty secure sharing of voiceprints. Furthermore, embodiments disclosed herein describe systems and methods for computing similarity scores between the encrypted voiceprints and unencrypted voiceprints. For the securing sharing and the computation of the similarity scores, each party's knowledge is limited to own plaintext voiceprints (represented by plaintext i-vectors). For example, a first client computer ("Alice") may have received an incoming call and extract a i-vector from the incoming call. A second client computer ("Bob") may have encrypted i-vectors (voiceprints) models stored with the first client computer. A third party server may calculate a final similarity score between the i-vector extracted from the calls or any other audio and the stored encrypted i-vectors models. None of the aforementioned parties may have to know more than required. It should be understood that description of voiceprints in terms of i-vectors throughout this disclosure is merely for an illustration and ease of explanation, and other forms vector representation of voiceprints, such as convolutional neural network (CNN) based c-vectors, should be considered within the scope of this disclosure.

The first client computer may know its own input, e.g., the plaintext i-vector extracted from the incoming call, and may not know the final score from the third party server and the stored plaintext i-vectors from the second client computer. The third-party server may provide a form a final score to the first client computer, e.g., match/no-match. The second client computer may know its stored plaintext i-vectors. The third party server may know only the final computer similarity score and neither the plaintext i-vectors of the second client computer nor the plaintext i-vector generated by the first client computer from the incoming call.

In this manner, each of the first and second client computers knows only the self-generated plaintext i-vectors. The i-vectors received from other parties are always encrypted and the similarity calculations are performed without decrypting the encrypted i-vectors. Furthermore, the third party server does not know the plaintext i-vectors generated by either of the first and second client computers. The third party may generate a similarity score based upon encrypted comparison models received from the first client computer without a knowledge of the sets of the i-vectors that were compared against each other. In addition, the third party server only may know the similarity score without sharing the similarity score with the first client computer.

To determine a similarity between i-vectors, a computer may compute a cosine distance between the i-vectors. The i-vectors may be n dimensional feature vectors. For example, a computer may compute a cosine distance between two n dimensional feature vectors $\vec{A}=\{a_1, a_2, \ldots, a_n\}$ and $\vec{B}=\{b_1, b_2, \ldots, b_n\}$ as follows:

$$\vec{A} \cdot \vec{B} = a_1 b_1 + a_2 b_2 + \ldots + a_n b_n$$

In some embodiments, each of the feature vectors may be a unit vector, e.g., $|\vec{A}|=1$ and $|\vec{B}|=1$.

Diffie-Hellman key exchange and elliptical curve cryptographic have been two popular key (i.e., a secret) exchange protocols for sharing a secret between two computer nodes. The following are the steps taken by the first client computer ("Alice") and the second client computer ("Bob") for exchanging a shared secret.

1. Alice and Bob may agree to use a large prime number p and base g (generator function). The recommendation is to choose p with at least 1024 bits. A popular protocol openssl chooses 2 or 5.
2. Alice may choose a secret integer a and sends to Bob $A=g^a \mod p$.
3. Bob may choose a secret integer b and sends to Alice $B=g^b \mod p$.
4. Alice may compute $s=B^a \mod p = g^{ba} \mod p$.
5. Bob may compute $s=A^b \mod p = g^{ab} \mod p$.
6. Alice and Bob may now have a shared secret s.

It should be noted that only a, b, and ($g^{ab} \mod p = g^{ba} \mod p$) are kept secret. All the other values: p, g, $g^a \mod p$, and $g^b \mod p$ are sent in the clear, i.e., through insecure, open channels.

Elliptical curve cryptography is another protocol that allows for smaller keys for a comparable level of security from other protocols. The smaller keys may be important as more and more cryptography techniques are performed on less powerful devices like mobile phones. An elliptical curve discrete logarithm hard problem may underpin elliptical curve cryptography. As a starting point, a computer takes an equation for an elliptical curve, such as $$y^2 = x^3 + ax + b$$

FIG. 1 shows a graph 100 generated by the above equation. As seen in the graph 100, an elliptical curve 102 locus is positioned within a Cartesian plane formed by x-axis 104 and y-axis 106.

Embodiments disclosed herein may use the properties from elliptical curve Diffie-Hellman Ephemeral (ECDHE) protocol, which is a protocol for exchanging keys based upon known elliptical curves. These known elliptical curves are public and are standard curves used for security in the cryptography industry. Given a curve, E (such as curve 102), defined along some equation in a finite field (such as E: $y^2=x^3+ax+b$), point multiplication is defined as the repeated addition of a point along that curve. For example, a point multiplication may be $nP=P+P+P+ \ldots +P$ for some scalar (integer) n and a point $P=(x, y)$ that lies on the curve, E. An ECDHE protocol utilizing the curve E and implemented by two computers (the first client computer "Alice" and the second computer "Bob") is detailed below:

1. Alice and Bob may agree on a set of parameters of the E curve, a prime p and a base point G. In some embodiments, Alice and Bob may use recommended curves rather than creating own curves.
2. Alice may choose a secret integer a and may send to Bob A=aG mod p.
3. Bob may choose a secret integer b and may send to Alice B=bG mod p.
4. Alice may compute s=aB mod p=baG mod p.
5. Bob may compute s=bA mod p=abG mod p.
6. Alice and Bob may now have a shared secret s.

Embodiments disclosed herein describe systems and method for leveraging features of Diffie-Hellman or Elliptical Curve Cryptography to securely share voiceprints and securely calculating the similarity scores between the voiceprints. One should understand that the cryptographic protocols, e.g., Diffie-Hellman and Elliptical Curve Cryptography, are merely illustrative and other cryptographic protocols should be considered within the scope of this disclosure. Furthermore, the calculations of cosine distances for similarity scores are also merely illustrative and other forms of distance calculations for the similarity scores should also be considered within the scope of this disclosure. Other forms of distances calculations may include, but are not limited to, Euclidean distance, Manhattan distance, and neural network perceptron classification.

Figure 2:
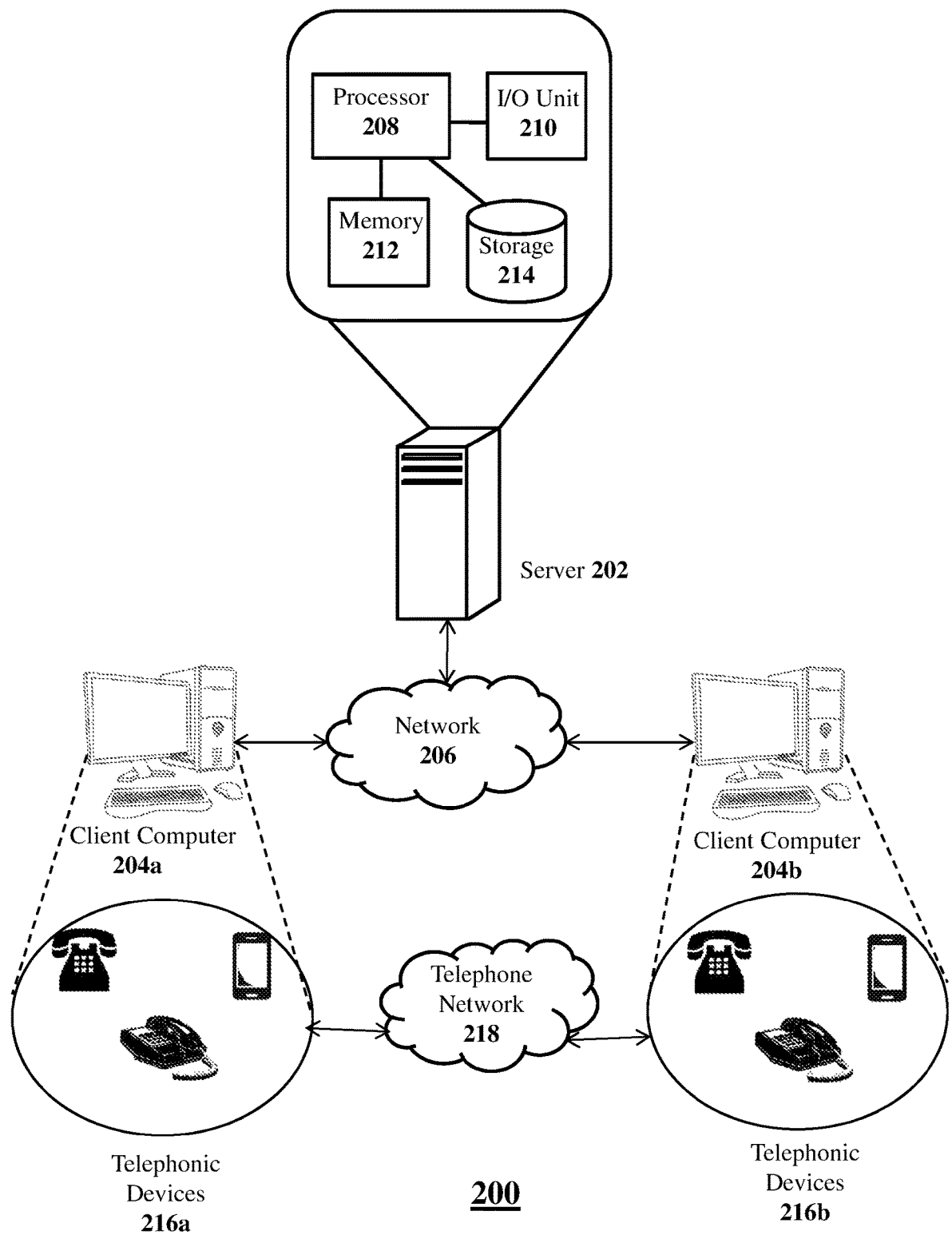
FIG. 2 shows a network environment for securing sharing of voiceprints, according to an embodiment.

FIG. 2 shows an illustrative network environment 200 for a secure sharing of voiceprints, according to an illustrative embodiment. The network environment 200 may include a server 202 and a plurality of client computers 204 (204a, 204b shown for illustration) interconnected using a network 206. The server 202 may be an intermediary or a third party providing security features, such as authentication, for communications between the client computers 204.

The server 202 may include a processor 208, an input output (I/O) unit 210, a memory 212, and storage 214. The processor 208 may include any type of processor that may implement one or more instruction sets to enable the processing functionality of the server 202. The I/O unit 210 may communicate with the client computers 204 and/or other computers through the network 206. The memory 212 may be any type of non-transitory memory from which the processor 208 may read input instructions and input data, and to which the processor 208 write output instructions and output data. For instance, the memory 212 may be a random access memory (RAM), cache memory, and/or virtual memory implemented by the operating system of the server 202 utilizing a portion of the storage 214. The storage 214 may any type of electronic storage, such as a hard drive, to store the software modules used by the processor 208 for authenticating the communications between the client devices 204.

The network 206 may be any type of network implementing one or more communication protocols between the server 202 and the client computer 204. Examples of the network 206 include, but are not limited to, Local Area Network (LAN), Desk Area Network (DAN), Wireless Local Area Network (WLAN), Metropolitan Area Network (MAN), Wide Area Network (WAN), and the Internet. The communication over the network 206 may be performed in accordance with the one or more communication protocols, such as Transmission Control Protocol and Internet Protocol (TCP/IP), User Datagram Protocol (UDP), and IEEE communication protocols.

The first and second client computer 204a, 204b may be associated with corresponding telephonic devices 216a, 216b. For example, the client computers 204 may be servers at a call center including the telephonic devices 216. The telephonic devices 216 may communicate with each other through a telephone network 218. Alternatively, the telephonic devices 216 may communicate with each other through the network 206 using one or more voice over internet protocols (VoIPs) and/or any other communication protocols.

In operation, the first client computer 204a may receive one or more encrypted voiceprints associated with the second client computer 204b. The one or more encrypted voiceprints may have been extracted from one or more persons using one or more telephonic devices 216b. The first client computer 204a may store one or more encrypted voiceprints. Upon receiving a call, the first client computer 204a may extract a plaintext voiceprint from the call. The first client computer 204a may compare the plaintext voiceprint of the call with the stored one or more encrypted voiceprints to generate one or more encrypted comparison models. It should be understood that receiving a call at the first client computer 204a is merely for illustration. For example, the first client computer 204a may extract a plaintext voiceprint from a stored audio. In some embodiments, the first client computer 204a may be mobile device and an audio may be provided to authenticate a speaker to the mobile device. In some embodiments, a speaker may provide an audio for authentication into a web-browser. The first client computer 204a may then transmit the one or more encrypted comparison models to the server 202, which may then decrypt the one or more comparison models to determine a similarity score between the plaintext voiceprint extracted by the first client computer 204a and the one or more encrypted voiceprints received from the second client computer 204b.

Figure 3:
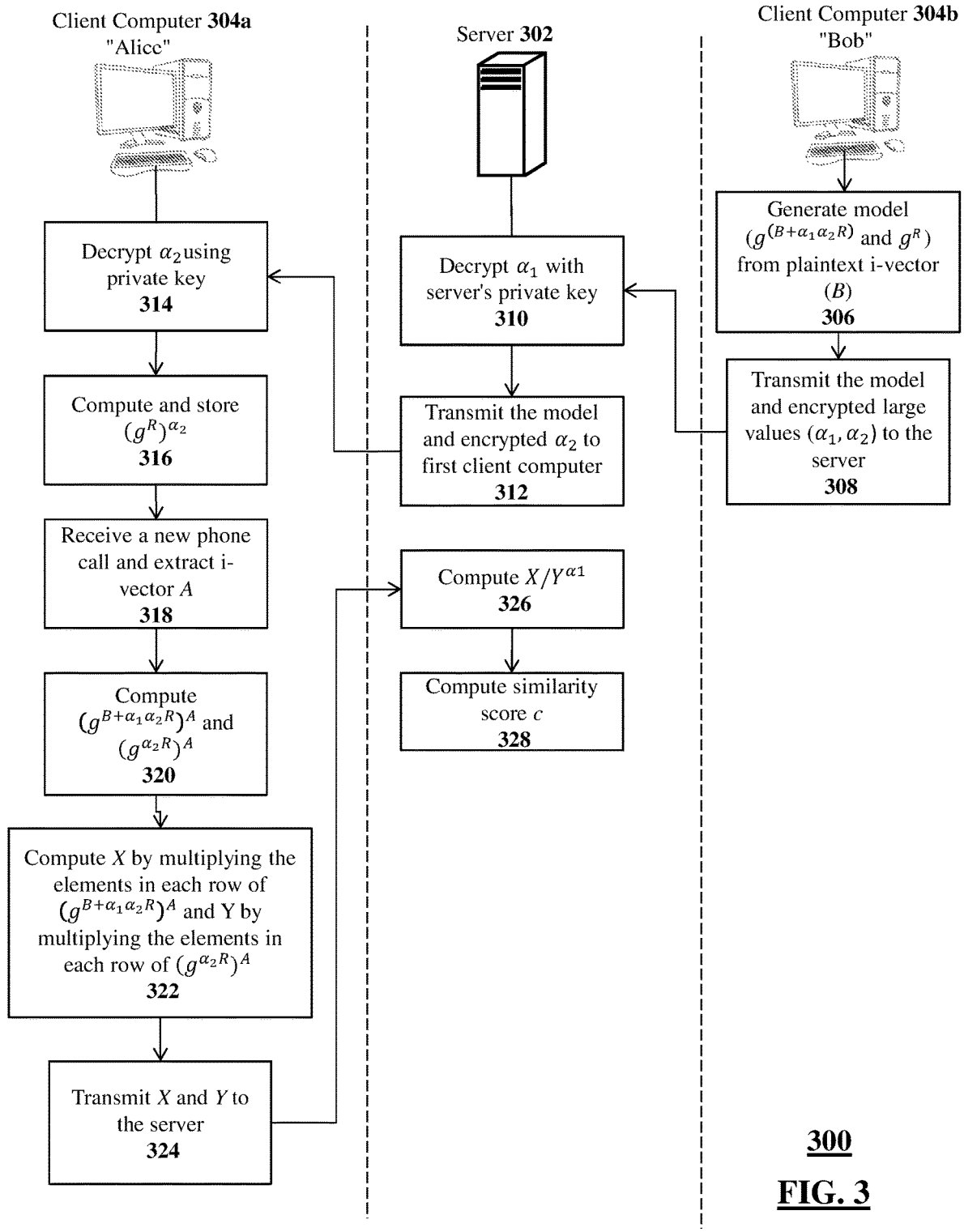
FIG. 3 shows an illustrative method of secure sharing of voiceprints, according to an embodiment.

FIG. 3 shows a first illustrative method 300 for zero-knowledge multiparty secure sharing of voiceprints, according to an illustrative embodiment. Although the method may be implemented by multiple computers and multiple databases, the description below details, for brevity, the steps of the method being implemented by a first client computer 304a, a server 302, and a second client computer 304b. One should also understand that the steps shown herein are merely illustrative, and additional or alternative steps may be executed by one or more of the first client computer 304a, the server 302, and the second client computer 304b. Furthermore, one or more of the first client computer 304a, the server 302, and the second client computer 304b may skip one or more steps of the method 300. It should also be understood that the attribution of various steps to the one or more first client computer 304a, the server 302, and the second client computer 304b is merely illustrative and steps may be performed by unattributed devices as well. Furthermore, the description of voiceprints in terms of i-vectors in the method 300 is merely for an illustration, and other forms vector representation of voiceprints, such as convolutional neural network (CNN) based c-vectors, should be considered within the scope of this disclosure.

The method may begin at step 306, where the second client computer 304b may generate a model from a plurality of plaintext i-vectors (a combination of voiceprints of multiple speakers). A matrix B containing the plurality of plaintext i-vectors (e.g., m i-vectors) may be defined as $$B = \begin{bmatrix} b_{11} & b_{12} & \cdots & b_{1n} \\ b_{21} & b_{22} & \cdots & b_{2n} \\ \vdots & \vdots & \ddots & \vdots \\ b_{m1} & b_{m2} & \cdots & b_{mn} \end{bmatrix}$$

The second client computer 304b may select two large values (1024-1 bits) $\alpha_1$, $\alpha_2$, and a random array (R), defined as $$R = \begin{bmatrix} r_{11} & r_{12} & \cdots & r_{1n} \\ r_{21} & r_{22} & \cdots & r_{2n} \\ \vdots & \vdots & \ddots & \vdots \\ r_{m1} & r_{m2} & \cdots & r_{mn} \end{bmatrix}$$

Using B, $\alpha_1$, $\alpha_2$ and R, the second client computer 304b may compute the following array:

$$B + \alpha_1\alpha_2 R = \begin{bmatrix} b_{11} + \alpha_1\alpha_2 r_{11} & b_{12} + \alpha_1\alpha_2 r_{12} & \cdots & b_{1n} + \alpha_1\alpha_2 r_{1n} \\ b_{21} + \alpha_1\alpha_2 r_{21} & b_{22} + \alpha_1\alpha_2 r_{22} & \cdots & b_{2n} + \alpha_1\alpha_2 r_{2n} \\ \vdots & \vdots & \ddots & \vdots \\ b_{m1} + \alpha_1\alpha_2 r_{m1} & b_{m2} + \alpha_1\alpha_2 r_{m2} & \cdots & b_{mn} + \alpha_1\alpha_2 r_{mn} \end{bmatrix}$$

Using the above array, a base g, and the array R, the second client computer 304b may compute the following arrays:

$$g^{(B+\alpha_1\alpha_2 R)} = \begin{bmatrix} g^{b_{11}+\alpha_1\alpha_2 r_{11}} & g^{b_{12}+\alpha_1\alpha_2 r_{12}} & \cdots & g^{b_{1n}+\alpha_1\alpha_2 r_{1n}} \\ g^{b_{21}+\alpha_1\alpha_2 r_{21}} & g^{b_{22}+\alpha_1\alpha_2 r_{22}} & \cdots & g^{b_{2n}+\alpha_1\alpha_2 r_{2n}} \\ \vdots & \vdots & \ddots & \vdots \\ g^{b_{m1}+\alpha_1\alpha_2 r_{m1}} & g^{b_{m2}+\alpha_1\alpha_2 r_{m2}} & \cdots & g^{b_{mn}+\alpha_1\alpha_2 r_{mn}} \end{bmatrix}$$

and $$g^R = \begin{bmatrix} g^{r_{11}} & g^{r_{12}} & \cdots & g^{r_{1n}} \\ g^{r_{21}} & g^{r_{22}} & \cdots & g^{r_{2n}} \\ \vdots & \vdots & \ddots & \vdots \\ g^{r_{m1}} & g^{r_{m2}} & \cdots & g^{r_{mn}} \end{bmatrix}$$

The terms $g^{(B+\alpha_1\alpha_2 R)}$ and $g^R$ may form an encrypted model for the matrix B containing m plaintext i-vectors.

At step 308, the second client computer 304b may transmit the model of the m plaintext i-vectors to the server 302. That is, the second client computer 304b may transmit $g^{(B+\alpha_1\alpha_2 R)}$ and $g^R$ to the server 302. In addition, the second client computer 304b may encrypt $\alpha_1$ using public key ($K_{TP}$) of the server 302 to generate $E(K_{TP}, \alpha_1)$. The second client computer 304b may encrypt $\alpha_2$ using public key ($K_A$) of the first client computer 304a to generate $E(K_A, \alpha_2)$. In some embodiments, the second client computer 304b may generate $E(K_{TP}, \alpha_1)$ and $E(K_A, \alpha_2)$ using any asymmetric cryptoalgorithms such as the RSA (Rivest-Shamir-Adelman) algorithm. The second client computer 304b may also transmit $E(K_A, \alpha_1)$ and $E(K_{TP}, \alpha_2)$ with the model to the server 302.

At step 310, the server 302 may decrypt $E(K_{TP}, \alpha_1)$ using the private key of the server 302. At step 310, the server may transmit the model and the encrypted $\alpha_2$ to the first client computer 304a. That is, the server may transmit $g^{(B+\alpha_1\alpha_2 R)}$, $g^R$, and $E(K_A, \alpha_2)$ to the first client computer 304a. At step 314, the first client computer 304a may decrypt $E(K_A, \alpha_2)$ using the private key of the first client computer 304a. At step 316, the first client computer 304a may compute and store $(g^R)^{\alpha_2}$ as follows:

$$(g^R)^{\alpha_2} = \begin{bmatrix} g^{\alpha_2 r_{11}} & g^{\alpha_2 r_{12}} & \cdots & g^{\alpha_n r_{1n}} \\ g^{\alpha_2 r_{21}} & g^{\alpha_2 r_{22}} & \cdots & g^{\alpha_2 r_{2n}} \\ \vdots & \vdots & \ddots & \vdots \\ g^{\alpha_2 r_{m1}} & g^{\alpha_2 r_{m2}} & \cdots & g^{\alpha_2 r_{mn}} \end{bmatrix} = g^{\alpha_2 R}$$

At step 318, the first client computer 304a may receive a new phone call (also referred to as an incoming phone call), extract features from the voiceprint of the phone call and generate a plaintext i-vector A as follows:

$$A = [a_1 a_2 \ldots a_n]$$

To compute a similarity score (e.g., cosine score) between the encrypted i-vector B with the i-vector A, the first client computer 304a may compute $(g^{B+\alpha_1\alpha_2 R})^A$ and $(g^{\alpha_2 R})^A$ at step 320. The computations are as follows:

$$(g^{B+\alpha_1\alpha_2 R})^A = \begin{bmatrix} (g^{b_{11}+\alpha_1\alpha_2 r_{11}})^{a_1} & (g^{b_{12}+\alpha_1\alpha_2 r_{12}})^{a_2} & \cdots & (g^{b_{1n}+\alpha_1\alpha_2 r_{1n}})^{a_n} \\ (g^{b_{21}+\alpha_1\alpha_2 r_{21}})^{a_1} & (g^{b_{22}+\alpha_1\alpha_2 r_{22}})^{a_2} & \cdots & (g^{b_{2n}+\alpha_1\alpha_2 r_{2n}})^{a_n} \\ \vdots & \vdots & \ddots & \vdots \\ (g^{b_{m1}+\alpha_1\alpha_2 r_{m1}})^{a_1} & (g^{b_{m2}+\alpha_1\alpha_2 r_{m2}})^{a_2} & \cdots & (g^{b_{mn}+\alpha_1\alpha_2 r_{mn}})^{a_n} \end{bmatrix}$$

$$= \begin{bmatrix} g^{a_1 b_{11}+\alpha_1\alpha_2 r_{11} a_1} & g^{a_2 b_{12}+\alpha_1\alpha_2 r_{12} a_2} & \cdots & g^{a_n b_{1n}+\alpha_1\alpha_2 r_{1n} a_n} \\ g^{a_1 b_{21}+\alpha_1\alpha_2 r_{21} a_1} & g^{a_2 b_{22}+\alpha_1\alpha_2 r_{22} a_2} & \cdots & g^{a_n b_{2n}+\alpha_1\alpha_2 r_{2n} a_n} \\ \vdots & \vdots & \ddots & \vdots \\ g^{a_1 b_{m1}+\alpha_1\alpha_2 r_{m1} a_1} & g^{a_2 b_{m2}+\alpha_1\alpha_2 r_{m2} a_2} & \cdots & g^{a_n b_{mn}+\alpha_1\alpha_2 r_{mn} a_n} \end{bmatrix}$$

and $$(g^{\alpha_2 R})^A = \begin{bmatrix} (g^{\alpha_2 r_{11}})^{a_1} & (g^{\alpha_2 r_{21}})^{a_2} & \cdots & (g^{\alpha_2 r_{1n}})^{a_n} \\ (g^{\alpha_2 r_{21}})^{a_1} & (g^{\alpha_2 r_{22}})^{a_2} & \cdots & (g^{\alpha_2 r_{2n}})^{a_n} \\ \vdots & \vdots & \ddots & \vdots \\ (g^{\alpha_2 r_{m1}})^{a_1} & (g^{\alpha_2 r_{m2}})^{a_2} & \cdots & (g^{\alpha_2 r_{mn}})^{a_n} \end{bmatrix}$$

$$= \begin{bmatrix} g^{\alpha_2 r_{11} a_1} & g^{\alpha_2 r_{12} a_2} & \cdots & g^{\alpha_2 r_{1n} a_n} \\ g^{\alpha_2 r_{21} a_1} & g^{\alpha_2 r_{22} a_2} & \cdots & g^{\alpha_2 r_{2n} a_n} \\ \vdots & \vdots & \ddots & \vdots \\ g^{\alpha_2 r_{m1} a_1} & g^{\alpha_2 r_{m2} a_2} & \cdots & g^{\alpha_2 r_{mn} a_n} \end{bmatrix}$$

At step 322, the first client computer may multiply each element in each row of $(g^{B+\alpha_1\alpha_2 R})^A$ with itself and multiply each element in each row of $(g^{\alpha_2 R})^A$ with itself to generate X and Y respectively. These computations are as follows:

$$X = \begin{bmatrix} g^{a_1 b_{11}+a_1 a_2 r_{11} a_1} g^{a_2 b_{12}+a_1 a_2 r_{12} a_2} \ldots g^{a_n b_{1n}+a_1 a_2 r_{1n} a_n} \\ g^{a_1 b_{21}+a_1 a_2 r_{21} a_1} g^{a_2 b_{22}+a_1 a_2 r_{22} a_2} \ldots g^{a_n b_{2n}+a_1 a_2 r_{2n} a_n} \\ \vdots \\ g^{a_1 b_{m1}+a_1 a_2 r_{m1} a_1} g^{a_2 b_{m2}+a_1 a_2 r_{m2} a_2} \ldots g^{a_n b_{mn}+a_1 a_2 r_{mn} a_n} \end{bmatrix}$$

$$= \begin{bmatrix} g^{a_1 b_{11}+a_1 a_2 r_{11} a_1 + a_2 b_{12}+a_1 a_2 r_{12} a_2 + \cdots + a_n b_{1n}+a_1 a_2 r_{1n} a_n} \\ g^{a_1 b_{21}+a_1 a_2 r_{21} a_1 + a_2 b_{22}+a_1 a_2 r_{22} a_2 + \cdots + a_n b_{2n}+a_1 a_2 r_{2n} a_n} \\ \vdots \\ g^{a_1 b_{m1}+a_1 a_2 r_{m1} a_1 + a_2 b_{m2}+a_1 a_2 r_{m2} a_2 + \cdots + a_n b_{mn}+a_1 a_2 r_{mn} a_n} \end{bmatrix}$$

$$= \begin{bmatrix} g^{a_1 b_{11}+a_2 b_{12}+\cdots+a_n b_{1n}+a_1 a_2 r_{11} a_1 +a_1 a_2 r_{12} a_2+\cdots+a_1 a_2 r_{1n} a_n} \\ g^{a_1 b_{21}+a_2 b_{22}+\cdots+a_n b_{2n}+a_1 a_2 r_{21} a_1 +a_1 a_2 r_{22} a_2+\cdots+a_1 a_2 r_{2n} a_n} \\ \vdots \\ g^{a_1 b_{m1}+a_2 b_{m2}+\cdots+a_n b_{mn}+a_1 a_2 r_{m1} a_1 +a_1 a_2 r_{m2} a_2+\cdots+a_1 a_2 r_{mn} a_n} \end{bmatrix}$$

$$= \begin{bmatrix} g^{C_1+\alpha_1 \beta_1} \\ g^{C_2+\alpha_1 \beta_2} \\ \vdots \\ g^{C_m+\alpha_1 \beta_m} \end{bmatrix}$$

and $$Y = \begin{bmatrix} g^{\alpha_2 r_{11} a_1} g^{\alpha_2 r_{12} a_2} \ldots g^{\alpha_2 r_{1n} a_n} \\ g^{\alpha_2 r_{21} a_1} g^{\alpha_2 r_{22} a_2} \ldots g^{\alpha_2 r_{2n} a_n} \\ \vdots \\ g^{\alpha_2 r_{m1} a_1} g^{\alpha_2 r_{m2} a_2} \ldots g^{\alpha_2 r_{mn} a_n} \end{bmatrix}$$

$$= \begin{bmatrix} g^{\alpha_2 r_{11} a_1 + \alpha_2 r_{12} a_2 + \cdots + \alpha_2 r_{1n} a_n} \\ g^{\alpha_2 r_{21} a_1 + \alpha_2 r_{22} a_2 + \cdots + \alpha_2 r_{2n} a_n} \\ \vdots \\ g^{\alpha_2 r_{m1} a_1 + \alpha_2 r_{m2} a_2 + \cdots + \alpha_2 r_{mn} a_n} \end{bmatrix}$$

$$= \begin{bmatrix} g^{\beta_1} \\ g^{\beta_2} \\ \vdots \\ g^{\beta_m} \end{bmatrix}$$

where, $C_1 = a_1 b_{11} + a_2 b_{12} + \cdots + a_n b_{1n}$ $C_2 = a_1 b_{21} + a_2 b_{22} + \cdots + a_n b_{2n}$ $C_m = a_1 b_{m1} + a_2 b_{m2} + \cdots + a_n b_{mn}$ and $\beta_1 = \alpha_2(r_{11} a_1 + r_{12} a_2 + \cdots + r_{1n} a_n)$ $\beta_2 = \alpha_2(r_{21} a_1 + r_{22} a_2 + \cdots + r_{2n} a_n)$ $\beta_m = \alpha_2(r_{m1} a_1 + r_{m2} a_2 + \cdots + r_{mn} a_n)$ At step 324, the first client computer 304a may transmit X and Y to the server 302.

At step 326, the server 302 may use X, Y received from the first client computer 304a and $\alpha_1$ decrypted at step 310 to compute $X/Y^{\alpha_1}$ as follows:

$$X/Y^{\alpha_1} = \begin{bmatrix} g^{C_1+\alpha_1 \beta_1} \\ g^{C_2+\alpha_1 \beta_2} \\ \vdots \\ g^{C_m+\alpha_1 \beta_m} \end{bmatrix} / \begin{bmatrix} (g^{\beta_1})^{\alpha_1} \\ (g^{\beta_2})^{\alpha_1} \\ \vdots \\ (g^{\beta_m})^{\alpha_1} \end{bmatrix}$$

$$= \begin{bmatrix} g^{C_1} \cdot g^{\alpha_1 \beta_1} / g^{\alpha_1 \beta_1} \\ g^{C_2} \cdot g^{\alpha_1 \beta_2} / g^{\alpha_1 \beta_2} \\ \vdots \\ g^{C_m} \cdot g^{\alpha_1 \beta_m} / g^{\alpha_1 \beta_m} \end{bmatrix}$$

$$= \begin{bmatrix} g^{C_1} \\ g^{C_2} \\ \vdots \\ g^{C_m} \end{bmatrix}$$

At step 328, the server 302 may compute the similarity scores $[c_1, c_2, \ldots c_m]$. In some embodiments, the server 302 may perform a lookup operation to generate the corresponding plaintext scores $c_1, c_2, \ldots c_m$ from the encrypted scores $g^{C_1}, g^{C_2} \ldots g^{C_m}$. One or more of the plaintext scores $c_1, c_2, \ldots c_m$ may indicate the similarity between the plaintext i-vector B and the plaintext i-vector A. The plaintext scores were generated by a combination of steps by the server 302 and the first client computer 304a, where the first client computer did not have an access to the plaintext i-vector B (having an access to an encrypted version thereof) and the server 302 did not have access to either of the plaintext i-vectors A and B.

In some embodiments, the server 302 may transmit one or more of the plaintext scores $c_1, c_2, \ldots c_m$ to the first client computer 304b. Using the received plaintext scores, the first client computer 304a may authenticate the new call. In some embodiments, the server 302 may not transmit the plaintext scores and authenticate the incoming call based on the scores. The server 302 may then transmit an indication whether the incoming call is authenticated to the first client computer 304a. The determination of the authenticity of call may be made, whether at the server 302 or the first client computer 304a, may be made based on a threshold. A call may be authenticated if a plaintext score is above a threshold. The first client computer 304a and/or the server 302 may use the plaintext scores for fraud detection as well. For example, one or more voiceprint vectors in the matrix B may be voiceprints of a known fraudster. Upon determining by the first client computer 304a and/or the server 302 that the voiceprint vector A has a higher than threshold similarity score when compared to a voiceprint vector of a known fraudster in B, the first client computer 304a and/or the server 302 may generate an indication that a fraudulent call attempt has been made. In some embodiments, the first client computer 304a and/or the server 302 may use the similarity score for simply comparing two voiceprints.

Figure 4:
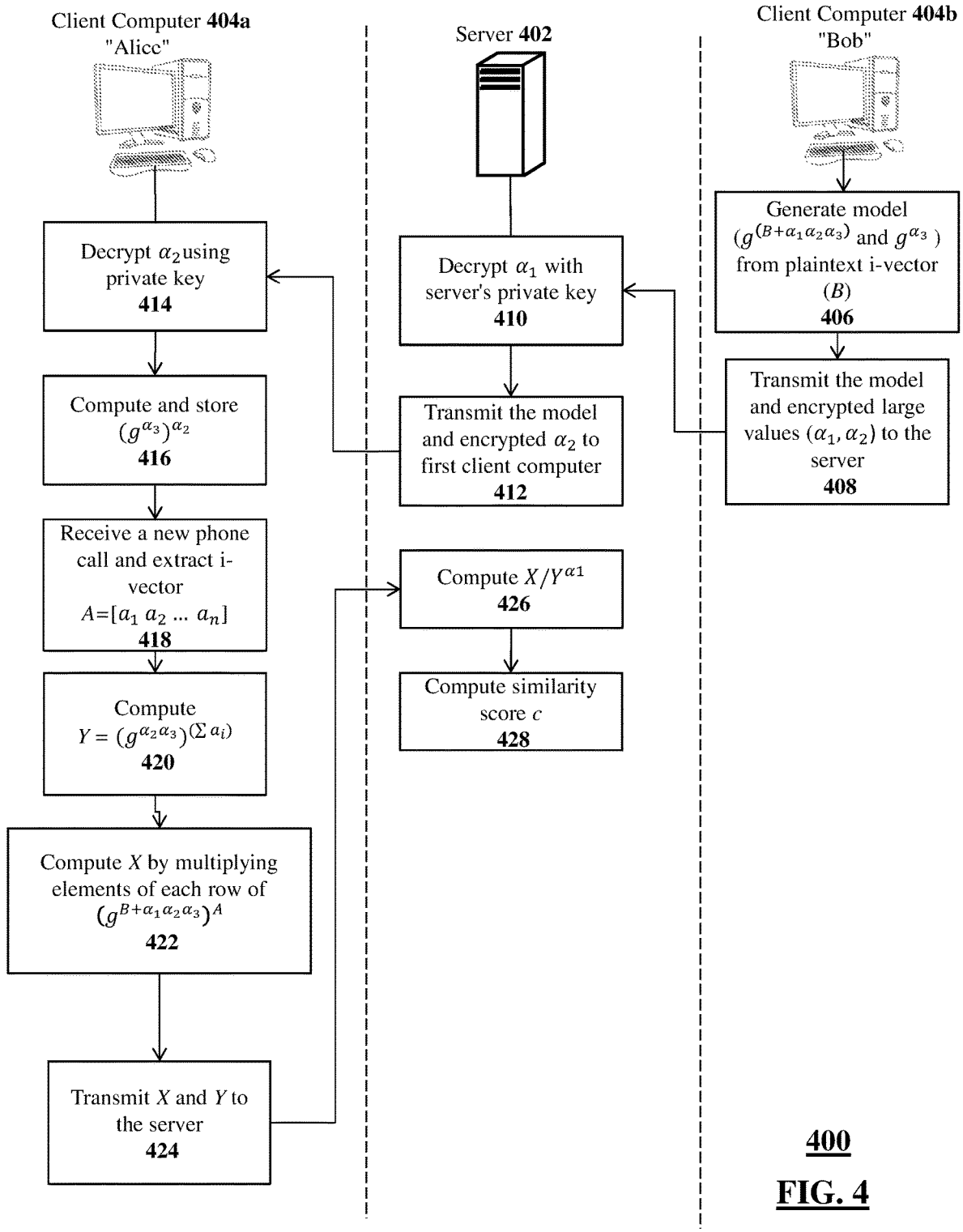
FIG. 4 shows an illustrative method of secure sharing of voiceprints, according to an embodiment.

FIG. 4 shows a second illustrative method 400 for zero-knowledge multiparty secure sharing of voiceprints, according to an illustrative embodiment. Although the method may be implemented by multiple computers and multiple databases, the description below details, for brevity, the steps of the method being implemented by a first client computer 404a, a server 402, and a second client computer 404b. One should also understand that the steps shown herein are merely illustrative, and additional or alternative steps may be executed by one or more of the first client computer 404a, the server 402, and the second client computer 404b. Furthermore, one or more of the first client computer 404a, the server 402, and the second client computer 404b may skip one or more steps of the method 400. It should also be understood that the attribution of various steps to the one or more the first client computer 404a, the sever 402, and the second client computer 404b is merely illustrative and steps may be performed by unattributed devices as well. Furthermore, the description of voiceprints in terms of i-vectors in the method 400 is merely for illustrations, and other forms vector representation of voiceprints, such as convolutional neural network (CNN) based c-vectors, should be considered within the scope of this disclosure.

The method may begin at step 406, where the second client computer 404b may generate a model from a plurality of plaintext i-vectors (for voiceprints of a plurality of speakers). A matrix B containing the plurality of plaintext i-vectors (e.g., m i-vectors) may be defined as $$B = \begin{bmatrix} b_{11} & b_{12} & \cdots & b_{1n} \\ b_{21} & b_{22} & \cdots & b_{2n} \\ \vdots & \vdots & \ddots & \vdots \\ b_{m1} & b_{m2} & \cdots & b_{mn} \end{bmatrix}$$

The second client computer 404b may select two large values (1024-1 bits) $\alpha_1$, $\alpha_2$ and choose a single random value $\alpha_3$. Using B, $\alpha_1$, $\alpha_2$, and $\alpha_3$, the second computer may compute the following:

$$B + \alpha_1\alpha_2\alpha_3 = \begin{bmatrix} b_{11} + \alpha_1\alpha_2\alpha_3 & b_{12} + \alpha_1\alpha_2\alpha_3 & \cdots & b_{1n} + \alpha_1\alpha_2\alpha_3 \\ b_{21} + \alpha_1\alpha_2\alpha_3 & b_{22} + \alpha_1\alpha_2\alpha_3 & \cdots & b_{2n} + \alpha_1\alpha_2\alpha_3 \\ \vdots & \vdots & \ddots & \vdots \\ b_{m1} + \alpha_1\alpha_2\alpha_3 & b_{m2} + \alpha_1\alpha_2\alpha_3 & \cdots & b_{mn} + \alpha_1\alpha_2\alpha_3 \end{bmatrix}$$

Using the array $B+\alpha_1\alpha_2\alpha_3$, g, and $\alpha_3$, the second client computer 404b may compute $g^{\alpha_3}$ and the following:

$$g^{(B+\alpha_1\alpha_2\alpha_3)} = \begin{bmatrix} g^{b_{11}+\alpha_1\alpha_2\alpha_3} & g^{b_{12}+\alpha_1\alpha_2\alpha_3} & \cdots & g^{b_{1n}+\alpha_1\alpha_2\alpha_3} \\ g^{b_{21}+\alpha_1\alpha_2\alpha_3} & g^{b_{22}+\alpha_1\alpha_2\alpha_3} & \cdots & g^{b_{2n}+\alpha_1\alpha_2\alpha_3} \\ \vdots & \vdots & \ddots & \vdots \\ g^{b_{m1}+\alpha_1\alpha_2\alpha_3} & g^{b_{m2}+\alpha_1\alpha_2\alpha_3} & \cdots & g^{b_{mn}+\alpha_1\alpha_2\alpha_3} \end{bmatrix}$$

The terms $g^{(B+\alpha_1\alpha_2\alpha_3)}$ and $g^{\alpha_3}$ may form an encrypted model for the matrix B containing m plaintext i-vectors.

At step 408, the second client computer 404b may transmit the model of the m plaintext i-vectors to the server 402. That is, the second client computer 404b may transmit $g^{(B+\alpha_1\alpha_2\alpha_3)}$ and $g^{\alpha_3}$ to the server 402. In addition, the second client computer 404b may encrypt $\alpha_1$ using public key ($K_{TP}$) of the server 402 to generate $E(K_{TP}, \alpha_1)$. The second client computer 404b may encrypt $\alpha_2$ using public key ($K_A$) of the first client computer 404a to generate $E(K_A, \alpha_2)$. In some embodiments, the second client computer 304b may generate $E(K_{TP}, \alpha_1)$ and $E(K_A, \alpha_2)$ using crypto-algorithms such as the RSA (Rivest-Shamir-Adelman) algorithm. The second client computer 404b may also transmit $E(K_{TP}, \alpha_1)$ and $E(K_A, \alpha_2)$ with the model to the server 402.

At step 410, the server 402 may decrypt $E(K_{TP}, \alpha_1)$ using the private key of the server 402. At step 412, the server may transmit the model and the encrypted $\alpha_2$ to the first client computer 404a. That is, the server may transmit $g^{(B+\alpha_1\alpha_2\alpha_3)}$, $g^{\alpha_3}$, and $E(K_A, \alpha_2)$ to the first client computer 404a. At step 414, the first client computer 404a may decrypt $E(K_A, \alpha_2)$ using the private key of the first client computer 404a. At step 416, the first client computer 404a may compute and store $(g^{\alpha_3})^{\alpha_2}$.

At step 418, the first client computer 404a may receive a new phone call (also referred to as an incoming phone call), extract features from the voiceprint of the phone call and generate a plaintext i-vector A as follows:

$$A = [a_1 a_2 \ldots a_n]$$

At step 420, the first client computer 404a may compute $Y = (g^{\alpha_2\alpha_3})^{(\Sigma a_i)}$. At step 422, the first client computer 404a may compute X. To compute X, the computer may first compute $g^{(B+\alpha_1\alpha_2\alpha_3)^A}$ as follows:

$$g^{(B+\alpha_1\alpha_2\alpha_3)^A} = \begin{bmatrix} (g^{b_{11}+\alpha_1\alpha_2\alpha_3})^{a_1} & (g^{b_{12}+\alpha_1\alpha_2\alpha_3})^{a_2} & \cdots & (g^{b_{1n}+\alpha_1\alpha_2\alpha_3})^{a_n} \\ (g^{b_{21}+\alpha_1\alpha_2\alpha_3})^{a_1} & (g^{b_{22}+\alpha_1\alpha_2\alpha_3})^{a_2} & \cdots & (g^{b_{2n}+\alpha_1\alpha_2\alpha_3})^{a_n} \\ \vdots & \vdots & \ddots & \vdots \\ (g^{b_{m1}+\alpha_1\alpha_2\alpha_3})^{a_1} & (g^{b_{m2}+\alpha_1\alpha_2\alpha_3})^{a_2} & \cdots & (g^{b_{mn}+\alpha_1\alpha_2\alpha_3})^{a_n} \end{bmatrix}$$

$$= \begin{bmatrix} g^{a_1 b_{11}+\alpha_1\alpha_2\alpha_3 a_1} & g^{a_2 b_{12}+\alpha_1\alpha_2\alpha_3 a_2} & \cdots & g^{a_n b_{1n}+\alpha_1\alpha_2\alpha_3 a_n} \\ g^{a_1 b_{21}+\alpha_1\alpha_2\alpha_3 a_1} & g^{a_2 b_{22}+\alpha_1\alpha_2\alpha_3 a_2} & \cdots & g^{a_n b_{2n}+\alpha_1\alpha_2\alpha_3 a_n} \\ \vdots & \vdots & \ddots & \vdots \\ g^{a_1 b_{m1}+\alpha_1\alpha_2\alpha_3 a_1} & g^{a_2 b_{m2}+\alpha_1\alpha_2\alpha_3 a_2} & \cdots & g^{a_n b_{mn}+\alpha_1\alpha_2\alpha_3 a_n} \end{bmatrix}$$

To compute X, the first client computer 404a may multiply each individual element of each row with itself as follows:

$$X = \begin{bmatrix} g^{a_1 b_{11}+\alpha_1\alpha_2\alpha_3 a_1} g^{a_2 b_{12}+\alpha_1\alpha_2\alpha_3 a_2} \cdots g^{a_n b_{1n}+\alpha_1\alpha_2\alpha_3 a_n} \\ g^{a_1 b_{21}+\alpha_1\alpha_2\alpha_3 a_1} g^{a_2 b_{22}+\alpha_1\alpha_2\alpha_3 a_2} \cdots g^{a_n b_{2n}+\alpha_1\alpha_2\alpha_3 a_n} \\ \vdots \\ g^{a_1 b_{m1}+\alpha_1\alpha_2\alpha_3 a_1} g^{a_2 b_{m2}+\alpha_1\alpha_2\alpha_3 a_2} \cdots g^{a_n b_{mn}+\alpha_1\alpha_2\alpha_3 a_n} \end{bmatrix}$$

$$= \begin{bmatrix} g^{a_1 b_{11}+\alpha_1\alpha_2\alpha_3 a_1 + a_2 b_{12}+\alpha_1\alpha_2\alpha_3 a_2 + \cdots + a_n b_{1n}+\alpha_1\alpha_2\alpha_3 a_n} \\ g^{a_1 b_{21}+\alpha_1\alpha_2\alpha_3 a_1 + a_2 b_{22}+\alpha_1\alpha_2\alpha_3 a_2 + \cdots + a_n b_{2n}+\alpha_1\alpha_2\alpha_3 a_n} \\ \vdots \\ g^{a_1 b_{m1}+\alpha_1\alpha_2\alpha_3 a_1 + a_2 b_{m2}+\alpha_1\alpha_2\alpha_3 a_2 + \cdots + a_n b_{mn}+\alpha_1\alpha_2\alpha_3 a_n} \end{bmatrix}$$

$$= \begin{bmatrix} g^{a_1 b_{11}+a_2 b_{12}+\cdots+a_n b_{1n}+\alpha_1\alpha_2\alpha_3 a_1 + \alpha_1\alpha_2\alpha_3 a_2 + \cdots + \alpha_1\alpha_2\alpha_3 a_n} \\ g^{a_1 b_{21}+a_2 b_{22}+\cdots+a_n b_{2n}+\alpha_1\alpha_2\alpha_3 a_1 + \alpha_1\alpha_2\alpha_3 a_2 + \cdots + \alpha_1\alpha_2\alpha_3 a_n} \\ \vdots \\ g^{a_1 b_{m1}+a_2 b_{m2}+\cdots+a_n b_{mn}+\alpha_1\alpha_2\alpha_3 a_1 + \alpha_1\alpha_2\alpha_3 a_2 + \cdots + \alpha_1\alpha_2\alpha_3 a_n} \end{bmatrix}$$

$$= \begin{bmatrix} g^{C_1+\alpha_1\beta} \\ g^{C_2+\alpha_1\beta} \\ \vdots \\ g^{C_m+\alpha_1\beta} \end{bmatrix}$$

where, $C_1 = a_1 b_{11} + a_2 b_{12} + \cdots + a_n b_{1n}$ $C_2 = a_1 b_{21} + a_2 b_{22} + \cdots + a_n b_{2n}$ $C_m = a_1 b_{m1} + a_2 b_{m2} + \cdots + a_n b_{mn}$ and $\beta = \alpha_2\alpha_3(a_1 + a_2 + \cdots + a_n)$ $= \alpha_2\alpha_3 \Sigma a_i$ At step 424, the first client computer 404a may transmit X and Y to the server 402. At step 426, the server 402 may use X, Y received from the first client computer 404a and $\alpha_1$ decrypted at step 410 to compute $X/Y^{\alpha 1}$ as follows:

$$X/Y^{\alpha 1} = \begin{bmatrix} g^{C_1+\alpha_1\beta} \\ g^{C_2+\alpha_1\beta} \\ \vdots \\ g^{C_m+\alpha_1\beta} \end{bmatrix} / \begin{bmatrix} (g^\beta)^{\alpha_1} \\ (g^\beta)^{\alpha_1} \\ \vdots \\ (g^\beta)^{\alpha_1} \end{bmatrix}$$

$$= \begin{bmatrix} g^{C_1} \cdot g^{\alpha_1\beta}/g^{\alpha_1\beta} \\ g^{C_2} \cdot g^{\alpha_1\beta}/g^{\alpha_1\beta} \\ \vdots \\ g^{C_m} \cdot g^{\alpha_1\beta}/g^{\alpha_1\beta} \end{bmatrix}$$

$$= \begin{bmatrix} g^{C_1} \\ g^{C_2} \\ \vdots \\ g^{C_m} \end{bmatrix}$$

At step 428, the server 402 may compute similarity score $[c_1, c_2, \ldots c_m]$. In some embodiments, the server 402 may perform a lookup operation to generate the corresponding plaintext scores $c_1, c_2, \ldots c_m$ from the encrypted scores $g^{C_1}$, $g^{C_2} \ldots g^{C_m}$. One or more of the plaintext scores $c_1, c_2, \ldots c_m$ may indicate the similarity between the plaintext i-vector B and the plaintext i-vector A. The plaintext scores were generated by a combination of steps by the server 402 and the first client computer 404a, where the first client computer did not have an access to the plaintext i-vector B (having an access to an encrypted version thereof) and the server 402 did not have access to either of the plaintext i-vectors A and B.

In some embodiments, the server 402 may transmit one or more of the plaintext scores $c_1, c_2, \ldots c_m$ to the first client computer 404b. Using the received plaintext scores, the first client computer 404a may authenticate the new call. In some embodiments, the server 402 may not transmit the plaintext scores and authenticate the incoming call based on the scores. The server 402 may then transmit an indication whether the incoming call is authenticated to the first client computer 404a. The determination of the authenticity of call may be made, whether at the server 402 or the first client computer 404a, may be made based on a threshold. A call may be authenticated if a plaintext score is above a threshold. The first client computer 404a and/or the server 402 may use the plaintext scores for fraud detection as well. For example, one or more voiceprint vectors in the matrix B may be voiceprints of a known fraudster. Upon determining by the first client computer 404a and/or the server 402 that the voiceprint vector A has a higher than threshold similarity score when compared to a voiceprint vector of a known fraudster in B, the first client computer 404a and/or the server 402 may generate an indication that a fraudulent call attempt has been made. In some embodiments, the first client computer 404a and/or the server 402 may use the similarity score for simply comparing two voiceprints.

Figure 5:
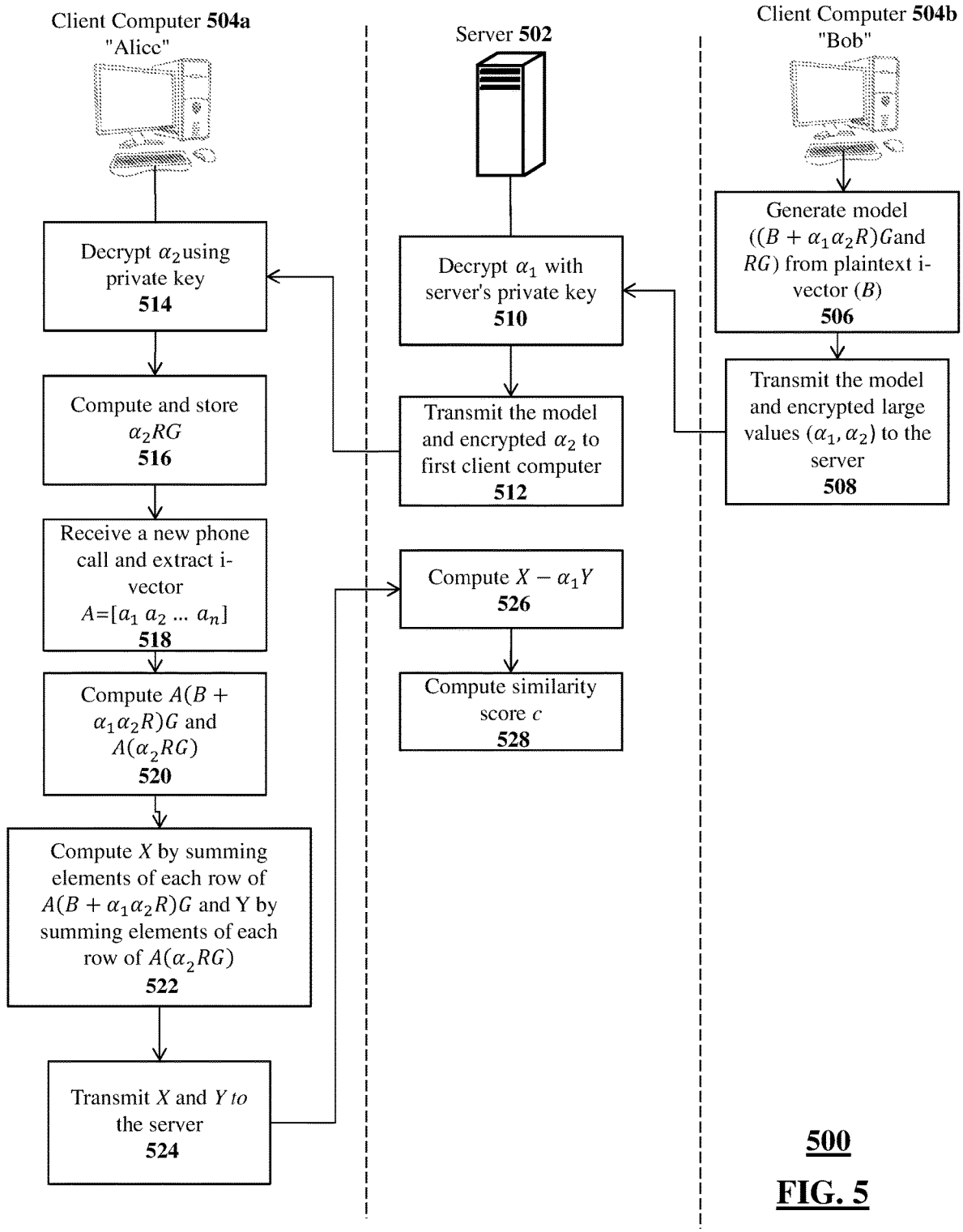
FIG. 5 shows an illustrative method of secure sharing of voiceprints, according to an embodiment.

FIG. 5 shows a third illustrative method 500 for zero-knowledge multiparty secure sharing of voiceprints, according to an illustrative embodiment. Although the method may be implemented by multiple computers and multiple databases, the description below details, for brevity, the steps of the method being implemented by a first client computer 504a, a server 502, and a second client computer 504b. One should also understand that the steps shown herein are merely illustrative, and additional or alternative steps may be executed by one or more of the first client computer 504a, the server 502, and the second client computer 504b. Furthermore, one or more of the first client computer 504a, the server 502, and the second client computer 504b may skip one or more steps of the method 500. It should also be understood that the attribution of various steps to the one or more the first client computer 504a, the server 502, and the second client computer 504b is merely illustrative and steps may be performed by unattributed devices as well. Furthermore, the description of voiceprints in terms of i-vectors in the method 500 is merely for illustrations, and other forms vector representation of voiceprints, such as convolutional neural network (CNN) based c-vectors, should be considered within the scope of this disclosure.

The method may begin at step 506, where the second client computer 504b may generate a model from a plurality of plaintext i-vectors (a combination of voiceprints of multiple speakers). A matrix B containing the plurality of plaintext i-vectors (e.g., m i-vectors) may be defined as $$B = \begin{bmatrix} b_{11} & b_{12} & \cdots & b_{1n} \\ b_{21} & b_{22} & \cdots & b_{2n} \\ \vdots & \vdots & \ddots & \vdots \\ b_{m1} & b_{m2} & \cdots & b_{mn} \end{bmatrix}$$

The second client computer 504b may choose two large values (1024-1 bits) $\alpha_1, \alpha_2$ and a random array R. The random array may be defined as $$R = \begin{bmatrix} r_{11} & r_{12} & \cdots & r_{1n} \\ r_{21} & r_{22} & \cdots & r_{2n} \\ \vdots & \vdots & \ddots & \vdots \\ r_{m1} & r_{m2} & \cdots & r_{mn} \end{bmatrix}$$

Using B, $\alpha_1$, $\alpha_2$ and R, the second client computer 504b may compute the following:

$$B + \alpha_1\alpha_2 R = \begin{bmatrix} b_{11}+\alpha_1\alpha_2 r_{11} & b_{12}+\alpha_1\alpha_2 r_{12} & \cdots & b_{1n}+\alpha_1\alpha_2 r_{1n} \\ b_{21}+\alpha_1\alpha_2 r_{21} & b_{22}+\alpha_1\alpha_2 r_{22} & \cdots & b_{2n}+\alpha_1\alpha_2 r_{2n} \\ \vdots & \vdots & \ddots & \vdots \\ b_{m1}+\alpha_1\alpha_2 r_{m1} & b_{m2}+\alpha_1\alpha_2 r_{m2} & \cdots & b_{mn}+\alpha_1\alpha_2 r_{mn} \end{bmatrix}$$

Using the above array $B+\alpha_1\alpha_2 R$ and G and R, the second client computer 504b may compute the $(B+\alpha_1\alpha_2 R)G$ and RG as follows:

$$(B+\alpha_1\alpha_2 R)G =$$
$$\begin{bmatrix} (b_{11}+\alpha_1\alpha_2 r_{11})G & (b_{12}+\alpha_1\alpha_2 r_{12})G & \cdots & (b_{1n}+\alpha_1\alpha_2 r_{1n})G \\ (b_{21}+\alpha_1\alpha_2 r_{21})G & (b_{22}+\alpha_1\alpha_2 r_{22})G & \cdots & (b_{2n}+\alpha_1\alpha_2 r_{2n})G \\ \vdots & \vdots & \ddots & \vdots \\ (b_{m1}+\alpha_1\alpha_2 r_{m1})G & (b_{m2}+\alpha_1\alpha_2 r_{m2})G & \cdots & (b_{mn}+\alpha_1\alpha_2 r_{mn})G \end{bmatrix}$$

and

-continued $$RG = \begin{bmatrix} r_{11}G & r_{12}G & \cdots & r_{1n}G \\ r_{21}G & r_{22}G & \cdots & r_{2n}G \\ \vdots & \vdots & \ddots & \vdots \\ r_{m1}G & r_{m2}G & \cdots & r_{mn}G \end{bmatrix}$$

The above matrices $(B+\alpha_1\alpha_2R)G$ and $RG$ may form an encrypted model of matrix B containing m plaintext i-vectors.

At step 508, the second client computer 504b may transmit the model of the plaintext i-vector B to the server 502. That is, the second client computer 504b may transmit $(B+\alpha_1\alpha_2R)G$ and $RG$ to the server 502. In addition, the second client computer 504b may encrypt $\alpha_1$ using public key $(K_{TP})$ of the server 502 to generate $E(K_{TP}, \alpha_1)$. The second client computer 504b may encrypt $\alpha_2$ using public key $(K_A)$ of the first client computer 504a to generate $E(K_A, \alpha_2)$. In some embodiments, the second client computer 504b may generate $E(K_{TP}, \alpha_1)$ and $E(K_A, \alpha_2)$ using crypto-algorithms such as the RSA (Rivest-Shamir-Adelman) algorithm. The second client computer 504b may also transmit $E(K_{TP}, \alpha_1)$ and $E(K_A, \alpha_2)$ with the model to the server 502.

At step 510, the server 502 may decrypt $E(K_{TP}, \alpha_1)$ using the private key of the server 502. At step 512, the server may transmit the model and the encrypted $\alpha_2$ to the first client computer 504a. That is, the server may transmit $(B+\alpha_1\alpha_2R)G$, $RG$, and $E(K_A, \alpha_2)$ to the first client computer 504a. At step 514, the first client computer 504a may decrypt $E(K_A, \alpha_2)$ using the private key of the first client computer 504a. At step 516, the first client computer 404a may compute and store $\alpha_2 RG$ as follows:

$$\alpha_2 RG = \begin{bmatrix} \alpha_2 r_{11}G & \alpha_2 r_{12}G & \cdots & \alpha_2 r_{1n}G \\ \alpha_2 r_{21}G & \alpha_2 r_{22}G & \cdots & \alpha_2 r_{2n}G \\ \vdots & \vdots & \ddots & \vdots \\ \alpha_2 r_{m1}G & \alpha_2 r_{m2}G & \cdots & \alpha_2 r_{mn}G \end{bmatrix}$$

At step 518, the first client computer 504a may receive a new phone call (also referred to as an incoming phone call) and extract an i-vector from the call phone call, as follows:

$$A = [a_1 a_2 \ldots a_n]$$

At step 520, the first client computer 504a may computer $A(B+\alpha_1\alpha_2R)G$ and $A(\alpha_2 RG)$ as follows:

$$A(B+\alpha_1\alpha_2R)G = \begin{bmatrix} a_1(b_{11}+\alpha_1\alpha_2 r_{11})G & a_2(b_{12}+\alpha_1\alpha_2 r_{12})G & \cdots & a_n(b_{1n}+\alpha_1\alpha_2 r_{1n})G \\ a_1(b_{21}+\alpha_1\alpha_2 r_{21})G & a_2(b_{22}+\alpha_1\alpha_2 r_{22})G & \cdots & a_n(b_{2n}+\alpha_1\alpha_2 r_{2n})G \\ \vdots & \vdots & \ddots & \vdots \\ a_1(b_{m1}+\alpha_1\alpha_2 r_{m1})G & a_2(b_{m2}+\alpha_1\alpha_2 r_{m2})G & \cdots & a_n(b_{mn}+\alpha_1\alpha_2 r_{mn})G \end{bmatrix}$$

$$= \begin{bmatrix} (a_1 b_{11}+a_1\alpha_1\alpha_2 r_{11})G & (a_2 b_{12}+a_2\alpha_1\alpha_2 r_{12})G & \cdots & (a_n b_{1n}+a_n\alpha_1\alpha_2 r_{1n})G \\ (a_1 b_{21}+a_1\alpha_1\alpha_2 r_{21})G & (a_2 b_{22}+a_2\alpha_1\alpha_2 r_{22})G & \cdots & (a_n b_{2n}+a_n\alpha_1\alpha_2 r_{2n})G \\ \vdots & \vdots & \ddots & \vdots \\ (a_1 b_{m1}+a_1\alpha_1\alpha_2 r_{m1})G & (a_2 b_{m2}+a_2\alpha_1\alpha_2 r_{m2})G & \cdots & (a_n b_{mn}+a_n\alpha_1\alpha_2 r_{mn})G \end{bmatrix}$$

and $$A(\alpha_2 RG) = \begin{bmatrix} (a_1\alpha_2 r_{11})G & (a_2\alpha_2 r_{12})G & \cdots & (a_n\alpha_2 r_{1n})G \\ (a_1\alpha_2 r_{21})G & (a_2\alpha_2 r_{22})G & \cdots & (a_n\alpha_2 r_{2n}G) \\ \vdots & \vdots & \ddots & \vdots \\ (a_1\alpha_2 r_{m1})G & (a_2\alpha_2 r_{m2})G & \cdots & (a_n\alpha_2 r_{mn})G \end{bmatrix}$$

At step 522, the first client computer 504a may compute X by summing (i.e. adding individual elements of) each row of $A(B+\alpha_1\alpha_2R)G$ with itself and Y by summing each row of $A(\alpha_2 RG)$ with itself. The computations are as follows:

$$X = \begin{bmatrix} (a_1 b_{11}+a_1\alpha_1\alpha_2 r_{11})G + (a_2 b_{12}+a_2\alpha_1\alpha_2 r_{12})G + \cdots + (a_n b_{1n}+a_n\alpha_1\alpha_2 r_{1n})G \\ (a_1 b_{21}+a_1\alpha_1\alpha_2 r_{21})G + (a_2 b_{22}+a_2\alpha_1\alpha_2 r_{22})G + \cdots + (a_n b_{2n}+a_n\alpha_1\alpha_2 r_{2n})G \\ \vdots \\ (a_1 b_{m1}+a_1\alpha_1\alpha_2 r_{m1})G + (a_2 b_{m2}+a_2\alpha_1\alpha_2 r_{m2})G + \cdots + (a_n b_{mn}+a_n\alpha_1\alpha_2 r_{mn})G \end{bmatrix}$$

$$= \begin{bmatrix} (a_1 b_{11}+a_1\alpha_1\alpha_2 r_{11}+a_2 b_{12}+a_2\alpha_1\alpha_2 r_{12}+\cdots+a_n b_{1n}+a_n\alpha_1\alpha_2 r_{1n})G \\ (a_1 b_{21}+a_1\alpha_1\alpha_2 r_{21}+a_2 b_{22}+a_2\alpha_1\alpha_2 r_{22}+\cdots+a_n b_{2n}+a_n\alpha_1\alpha_2 r_{2n})G \\ \vdots \\ (a_1 b_{m1}+a_1\alpha_1\alpha_2 r_{m1}+a_2 b_{m2}+a_2\alpha_1\alpha_2 r_{m2}+\cdots+a_n b_{mn}+a_n\alpha_1\alpha_2 r_{mn})G \end{bmatrix}$$

$$= \begin{bmatrix} (C_1+\alpha_1\beta_1)G \\ (C_2+\alpha_1\beta_2)G \\ \vdots \\ (C_m+\alpha_1\beta_m)G \end{bmatrix}$$

and

-continued $$Y = \begin{bmatrix} (a_1\alpha_2 r_{11})G + (a_2\alpha_2 r_{12})G + \cdots + (a_n\alpha_2 r_{1n})G \\ (a_1\alpha_2 r_{21})G + (a_2\alpha_2 r_{22})G + \cdots + (a_n\alpha_2 r_{2n})G \\ \vdots \\ (a_1\alpha_2 r_{m1})G + (a_2\alpha_2 r_{m2})G + \cdots + (a_n\alpha_2 r_{mn})G \end{bmatrix}$$

$$= \begin{bmatrix} (a_1\alpha_2 r_{11} + a_2\alpha_2 r_{12} + \cdots + a_n\alpha_2 r_{1n})G \\ (a_1\alpha_2 r_{21} + a_2\alpha_2 r_{22} + \cdots + a_n\alpha_2 r_{2n})G \\ \vdots \\ (a_1\alpha_2 r_{m1} + a_2\alpha_2 r_{m2} + \cdots + a_n\alpha_2 r_{mn})G \end{bmatrix}$$

$$= \begin{bmatrix} \beta_1 G \\ \beta_2 G \\ \vdots \\ \beta_m G \end{bmatrix}$$

where, $C_1 = a_1 b_{11} + a_2 b_{12} + \cdots + a_n b_{1n}$ $C_2 = a_1 b_{21} + a_2 b_{22} + \cdots + a_n b_{2n}$ $C_m = a_1 b_{m1} + a_2 b_{m2} + \cdots + a_n b_{mn}$ and $\beta_1 = \alpha_2(r_{11} a_1 + r_{12} a_2 + \cdots + r_{1n} a_n)$ $\beta_2 = \alpha_2(r_{21} a_1 + r_{22} a_2 + \cdots + r_{2n} a_n)$ $\beta_m = \alpha_2(r_{m1} a_1 + r_{m2} a_2 + \cdots + r_{mn} a_n)$ At step 526, the server 502 may calculate $X - \alpha_1 Y$ as follows:

$$X - \alpha_1 Y = \begin{bmatrix} (C_1 + \alpha_1 \beta_1)G \\ (C_2 + \alpha_1 \beta_2)G \\ \vdots \\ (C_m + \alpha_1 \beta_m)G \end{bmatrix} - \begin{bmatrix} \alpha_1 \beta_1 G \\ \alpha_1 \beta_2 G \\ \vdots \\ \alpha_1 \beta_m G \end{bmatrix}$$

$$= \begin{bmatrix} (C_1 + \alpha_1 \beta_1)G - \alpha_1 \beta_1 G \\ (C_2 + \alpha_1 \beta_2)G - \alpha_1 \beta_2 G \\ \vdots \\ (C_m + \alpha_1 \beta_m) - \alpha_1 \beta_m G \end{bmatrix}$$

$$= \begin{bmatrix} C_1 G \\ C_2 G \\ \vdots \\ C_m G \end{bmatrix}$$

At step 528, the server may compute a similarity score $[c_1, c_2, \ldots c_m]$. In some embodiments, the server 502 may perform a lookup operation to generate the corresponding plaintext scores $c_1, c_2, \ldots c_m$ from the encrypted scores $c_1 G, c_2 G, \ldots c_m G$. One or more of the plaintext scores $c_1, c_2, \ldots c_m$ thereof may indicate the similarity between the plaintext i-vector B and the plaintext i-vector A. The plaintext scores were generated by a combination of steps by the server 502 and the first client computer 504a, where the first client computer did not have an access to the plaintext i-vector B (having an access to an encrypted version thereof) and the server 502 did not have access to either of the plaintext i-vectors A and B.

In some embodiments, the server 502 may transmit one or more of the plaintext scores $c_1, c_2, \ldots c_m$ thereof to the first client computer 504b. Using the received plaintext scores, the first client computer 504a may authenticate the new call. In some embodiments, the server 502 may not transmit the plaintext scores and authenticate the incoming call based on the scores. The server 502 may then transmit an indication whether the incoming call is authenticated to the first client computer 504a. The determination of the authenticity of call may be made, whether at the server 502 or the first client computer 504a, may be made based on a threshold. A call may be authenticated if a plaintext score is above a threshold. The first client computer 504a and/or the server 502 may use the plaintext scores for fraud detection as well. For example, one or more voiceprint vectors in the matrix B may be voiceprints of a known fraudster. Upon determining by the first client computer 504a and/or the server 502 that voiceprint vector A has a higher than threshold similarity score when compared to a voiceprint vector of a known fraudster in B, the first client computer 504a and/or the server 502 may generate an indication that a fraudulent call attempt has been made.

Figure 6:
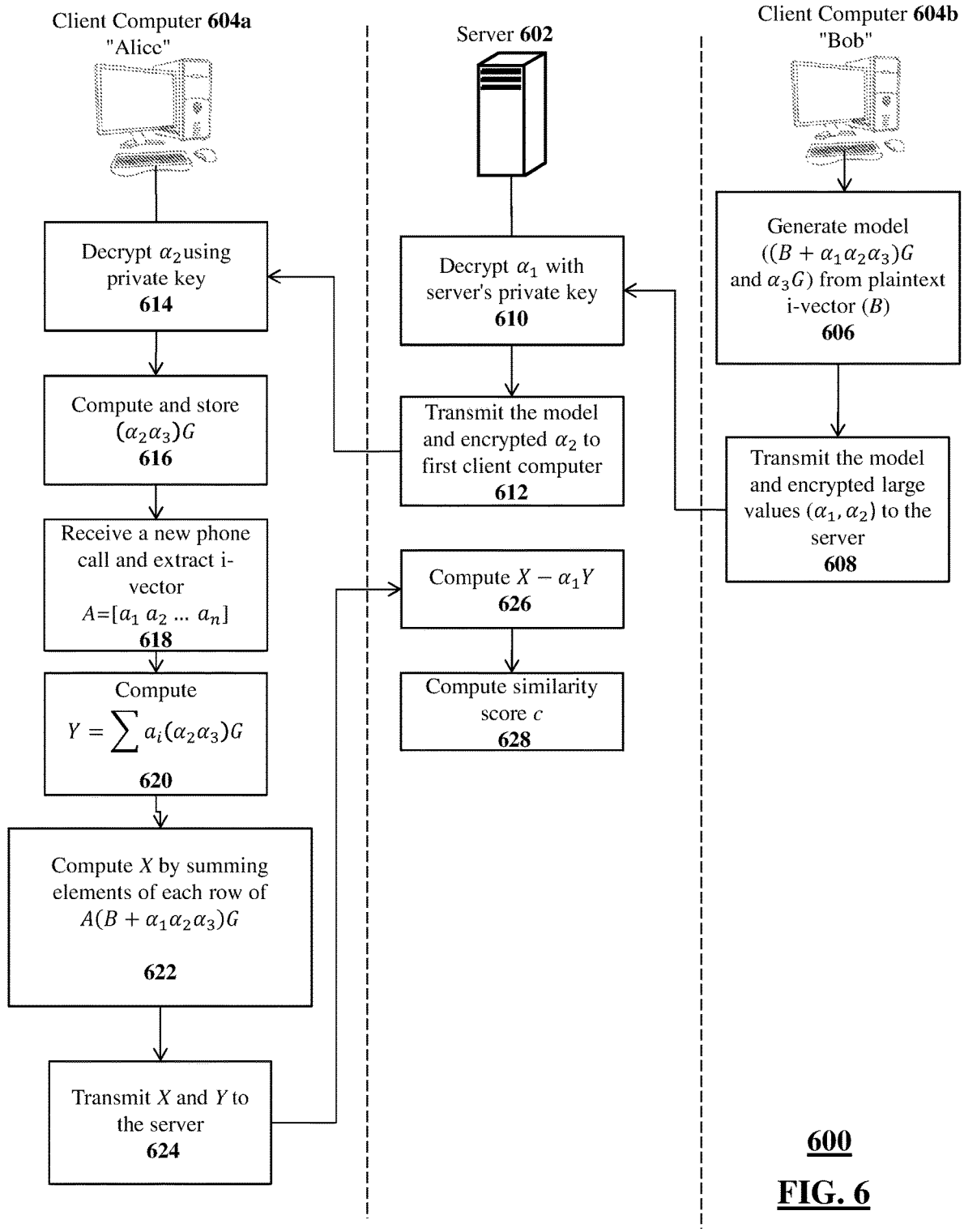
FIG. 6 shows an illustrative method of secure sharing of voiceprints, according to an embodiment.

FIG. 6 shows a fourth illustrative method 600 for zero-knowledge multiparty secure sharing of voiceprints, according to an illustrative embodiment. Although the method may be implemented by multiple computers and multiple databases, the description below details, for brevity, the steps of the method being implemented by a first client computer 604a, a server 602, and a second client computer 604b. One should also understand that the steps shown herein are merely illustrative, and additional or alternative steps may be executed by one or more of the first client computer 604a, the server 602, and the second client computer 604b. Furthermore, one or more of the first client computer 604a, the server 602, and the second client computer 604b may skip one or more steps of the method 600. It should also be understood that the attribution of various steps to the one or more the first client computer 604a, the server 602, and the second client computer 604b is merely illustrative and steps may be performed by unattributed devices as well. Furthermore, the description of voiceprints in terms of i-vectors in the method 600 is merely for illustrations, and other forms vector representation of voiceprints, such as convolutional neural network (CNN) based c-vectors, should be considered within the scope of this disclosure.

The method may begin at step 606, where the second client computer 604b may generate a model from a plurality of plaintext i-vectors (a combination of voiceprints of multiple speakers). A matrix B containing the plurality of plaintext i-vectors (e.g., m i-vectors) may be defined as:

$$B = \begin{bmatrix} b_{11} & b_{12} & \cdots & b_{1n} \\ b_{21} & b_{22} & \cdots & b_{2n} \\ \vdots & \vdots & \ddots & \vdots \\ b_{m1} & b_{m2} & \cdots & b_{mn} \end{bmatrix}$$

Using B, $\alpha_1$, $\alpha_2$ and $\alpha_3$, the second client computer 604b may compute the models as follows:

$$B + \alpha_1\alpha_2\alpha_3 = \begin{bmatrix} b_{11} + \alpha_1\alpha_2\alpha_3 & b_{12} + \alpha_1\alpha_2\alpha_3 & \cdots & b_{1n} + \alpha_1\alpha_2\alpha_3 \\ b_{21} + \alpha_1\alpha_2\alpha_3 & b_{22} + \alpha_1\alpha_2\alpha_3 & \cdots & b_{2n} + \alpha_1\alpha_2\alpha_3 \\ \vdots & \vdots & \ddots & \vdots \\ b_{m1} + \alpha_1\alpha_2\alpha_3 & b_{m2} + \alpha_1\alpha_2\alpha_3 & \cdots & b_{mn} + \alpha_1\alpha_2\alpha_3 \end{bmatrix}$$

$$(B + \alpha_1\alpha_2\alpha_3)G =$$

$$\begin{bmatrix} (b_{11} + \alpha_1\alpha_2\alpha_3)G & (b_{12} + \alpha_1\alpha_2\alpha_3)G & \cdots & (b_{1n} + \alpha_1\alpha_2\alpha_3)G \\ (b_{21} + \alpha_1\alpha_2\alpha_3)G & (b_{22} + \alpha_1\alpha_2\alpha_3)G & \cdots & (b_{2n} + \alpha_1\alpha_2\alpha_3)G \\ \vdots & \vdots & \ddots & \vdots \\ (b_{m1} + \alpha_1\alpha_2\alpha_3)G & (b_{m2} + \alpha_1\alpha_2\alpha_3)G & \cdots & (b_{mn} + \alpha_1\alpha_2\alpha_3)G \end{bmatrix}$$

The above matrix $(B+\alpha_1\alpha_2\alpha_3)G$ and $\alpha_3G$ matrix may form an encrypted model for the matrix B containing m plaintext i-vectors.

At step 608, the second client computer 604b may transmit the model of the m plaintext i-vectors to the server 602. That is, the second client computer 604b may transmit $(B+\alpha_1\alpha_2\alpha_3)G$ and $\alpha_3G$ to the server 602. In addition, the second client computer 604b may encrypt $\alpha_1$ using public key ($K_{TP}$) of the server 602 to generate $E(K_{TP}, \alpha_1)$. The second client computer 604b may encrypt $\alpha_2$ using public key ($K_A$) of the first client computer 604a to generate $E(K_A, \alpha_2)$.). In some embodiments, the second client computer 604b may generate $E(K_{TP}, \alpha_1)$ and $E(K_A, \alpha_2)$ using crypto-algorithms such as the RSA (Rivest-Shamir-Adelman) algorithm. The second client computer 604b may also transmit $E(K_{TP}, \alpha_1)$ and $E(K_A, \alpha_2)$ with the model to the server 602.

At step 610, the server 602 may decrypt $E(K_{TP}, \alpha_1)$ using the private key of the server 602. At step 612, the server may transmit the model and the encrypted $\alpha_2$ to the first client computer 604a. That is, the server may transmit $(B+\alpha_1\alpha_2\alpha_3)G$, $\alpha_3G$, and $E(K_A, \alpha_2)$ to the first client computer 604a. At step 614, the first client computer 604a may decrypt $E(K_A, \alpha_2)$ using the private key of the first client computer 604a. At step 616, the first client computer 604a may compute and store $(\alpha_2\alpha_3)G$ At step 618, the first client computer 604a may receive a new phone call and extract an i-vector from the call phone call, as follows:

$$A = [a_1 a_2 \ldots a_n]$$

At step 620, the first client computer 604a may compute $Y = \Sigma\alpha_i(\alpha_2\alpha_3)G$. At step 622, the first client computer 604a may compute X by summing elements of each row of the array $A(B+\alpha_1\alpha_2\alpha_3)G$ as follows:

$$A(B + \alpha_1\alpha_2\alpha_3)G = \begin{bmatrix} a_1(b_{11} + \alpha_1\alpha_2\alpha_3)G & a_2(b_{12} + \alpha_1\alpha_2\alpha_3)G & \cdots & a_n(b_{1n} + \alpha_1\alpha_2\alpha_3)G \\ a_1(b_{21} + \alpha_1\alpha_2\alpha_3)G & a_2(b_{22} + \alpha_1\alpha_2\alpha_3)G & \cdots & a_n(b_{2n} + \alpha_1\alpha_2\alpha_3)G \\ \vdots & \vdots & \ddots & \vdots \\ a_1(b_{m1} + \alpha_1\alpha_2\alpha_3)G & a_2(b_{m2} + \alpha_1\alpha_2\alpha_3)G & \cdots & a_n(b_{mn} + \alpha_1\alpha_2\alpha_3)G \end{bmatrix}$$

$$= \begin{bmatrix} (a_1b_{11} + a_1\alpha_1\alpha_2\alpha_3)G & (a_2b_{12} + a_2\alpha_1\alpha_2\alpha_3)G & \cdots & (a_nb_{1n} + a_n\alpha_1\alpha_2\alpha_3)G \\ (a_1b_{21} + a_1\alpha_1\alpha_2\alpha_3)G & (a_2b_{22} + a_2\alpha_1\alpha_2\alpha_3)G & \cdots & (a_nb_{2n} + a_n\alpha_1\alpha_2\alpha_3)G \\ \vdots & \vdots & \ddots & \vdots \\ (a_1b_{m1} + a_1\alpha_1\alpha_2\alpha_3)G & (a_2b_{m2} + a_2\alpha_1\alpha_2\alpha_3)G & \cdots & (a_nb_{mn} + a_n\alpha_1\alpha_2\alpha_3)G \end{bmatrix}$$

$$X = \begin{bmatrix} (a_1b_{11} + a_1\alpha_1\alpha_2\alpha_3)G + (a_2b_{12} + a_2\alpha_1\alpha_2\alpha_3)G + \cdots + (a_nb_{1n} + a_n\alpha_1\alpha_2\alpha_3)G \\ (a_1b_{21} + a_1\alpha_1\alpha_2\alpha_3)G + (a_2b_{22} + a_2\alpha_1\alpha_2\alpha_3)G + \cdots + (a_nb_{2n} + a_n\alpha_1\alpha_2\alpha_3)G \\ \vdots \\ (a_1b_{m1} + a_1\alpha_1\alpha_2\alpha_3)G + (a_2b_{m2} + a_2\alpha_1\alpha_2\alpha_3)G + \cdots + (a_nb_{mn} + a_n\alpha_1\alpha_2\alpha_3)G \end{bmatrix}$$

$$= \begin{bmatrix} (a_1b_{11} + a_1\alpha_1\alpha_2\alpha_3 + a_2b_{12} + a_2\alpha_1\alpha_2\alpha_3 + \cdots + a_nb_{1n} + a_n\alpha_1\alpha_2\alpha_3)G \\ (a_1b_{21} + a_1\alpha_1\alpha_2\alpha_3 + a_2b_{22} + a_2\alpha_1\alpha_2\alpha_3 + \cdots + a_nb_{2n} + a_n\alpha_1\alpha_2\alpha_3)G \\ \vdots \\ (a_1b_{m1} + a_1\alpha_1\alpha_2\alpha_3 + a_2b_{m2} + a_2\alpha_1\alpha_2\alpha_3 + \cdots + a_nb_{mn} + a_n\alpha_1\alpha_2\alpha_3)G \end{bmatrix}$$

$$= \begin{bmatrix} (C_1 + \alpha_1\beta)G \\ (C_2 + \alpha_1\beta)G \\ \vdots \\ (C_m + \alpha_1\beta)G \end{bmatrix}$$

where,

-continued $$C_1 = a_1b_{11} + a_2b_{12} + \cdots + a_nb_{1n}$$

$$C_2 = a_1b_{21} + a_2b_{22} + \cdots + a_nb_{2n}$$

$$C_m = a_1b_{m1} + a_2b_{m2} + \cdots + a_nb_{mn}$$

and $$\beta = \alpha_2\alpha_3(a_1 + a_2 \cdots + a_n)$$
$$= \alpha_2\alpha_3\Sigma a_i$$

At step 624, the first client computer 604*b* may transmit X and Y to the server 602. At step 626, the server may calculate X−α$_1$Y as follows:

$$X - \alpha_1 Y = \begin{bmatrix} (C_1 + \alpha_1\beta)G \\ (C_2 + \alpha_1\beta)G \\ \vdots \\ (C_m + \alpha_1\beta)G \end{bmatrix} - \begin{bmatrix} \alpha_1\beta G \\ \alpha_1\beta G \\ \vdots \\ \alpha_1\beta G \end{bmatrix}$$

$$= \begin{bmatrix} (C_1 + \alpha_1\beta)G - \alpha_1\beta G \\ (C_2 + \alpha_1\beta)G - \alpha_1\beta G \\ \vdots \\ (C_m + \alpha_1\beta)G - \alpha_1\beta G \end{bmatrix}$$

$$= \begin{bmatrix} C_1 G \\ C_2 G \\ \vdots \\ C_m G \end{bmatrix}$$

At step 628, the server may compute a similarity scores [$c_1, c_2, \ldots c_m$]. In some embodiments, the server 602 may perform a lookup operation to generate the corresponding plaintext scores $c_1, c_2, \ldots c_m$ from the encrypted scores $c_1G, c_2G, \ldots c_mG$. One or more of the plaintext scores $c_1, c_2, \ldots c_m$ may indicate the similarity between the plaintext i-vector B and the plaintext i-vector A. The plaintext scores were generated by a combination of steps by the server 602 and the first client computer 604*a*, where the first client computer did not have an access to the plaintext i-vector B (having an access to an encrypted version thereof) and the server 602 did not have access to either of the plaintext i-vectors A and B.

In some embodiments, the server 602 may transmit one or more of the plaintext scores $c_1, c_2, \ldots c_m$ to the first client computer 604*b*. Using the received plaintext scores, the first client computer 604*a* may authenticate the new call. In some embodiments, the server 602 may not transmit the plaintext scores and authenticate the incoming call based on the scores. The server 602 may then transmit an indication whether the incoming call is authenticated to the first client computer 604*a*. The determination of the authenticity of call may be made, whether at the server 502 or the first client computer 604*a*, may be made based on a threshold. A call may be authenticated if a plaintext score is above a threshold. The first client computer 604*a* and/or the server 602 may use the plaintext scores for fraud detection as well. For example, one or more voiceprint vectors in the matrix B may be voiceprints of a known fraudster. Upon determining by the first client computer 604*a* and/or the server 602 that the voiceprint vector A has a higher than threshold similarity score when compared to a voiceprint vector of a known fraudster in B, the first client computer 604*a* and/or the server 602 may generate an indication that a fraudulent call attempt has been made. In some embodiments, the first client computer 304*a* and/or the server 302 may use the similarity score for simply comparing two voiceprints.

In each of aforementioned methods 300, 400, 500, 600 all the elements of i-vectors may be double, e.g., $-1<a_i<1$ and/or $-1<b_i<1$. To improve the efficiency of calculation and minimize memory usage, a computer may use a function $f$ to convert each $a_i$ and $b_i$ into integers. Furthermore, the computer may limit the precision (e.g, to 4 decimal limits that may have a minimal effect on the final score) in the original $b_i$. As described below, limiting the precision may have minimal effect on the final computed cosine distance scores.

For a final computation of score, the computer may not perform calculations in the Diffie-Hellman based protocols (e.g., methods 300, 400) or solve with the use of any existing protocols. Rather, the computer may access a look-up dictionary storing precomputed values of all or nearly all possible score and provide a plain-text score to a requesting party.

In the Diffie-Hellman based protocols (e.g., methods 300, 400), if $a_i<0$, the computer may not take the inverses in steps 320 and 420. Instead, the computer may calculate the corresponding value separately and multiply together in steps 322 and 422 individually. The computer may compute one inverse at the end of steps 322 and 422 to reduce the total computation cost.

The computer may also perform the following optimizations for each of the steps 320 and 420 in each of the Diffie-Hellman based protocols (e.g., methods 300, 400):

In an embodiment, the computer may pre-compute all possible values at the first client computer (304*a*, 404*a*) and perform a dictionary lookup as opposed to computing the values in real time. The total values to be computed by the computer for this approach may be $2*10^5*2*10^5$ because the total possible values of the base are $2*10^5$ (ranging between −9999 and 9999) and similarly total possible values of the exponent are $2*10^5$ (ranging between −9999 and 9999). The disk space/memory required for these values may be 4.66 TB, because each computer value may be 128 bytes.

In another embodiment, the computer may precompute a set of possible values ("smart" possible values) and perform a combination of memory lookups and small computations. For e.g., let $a_1=1024$. Therefore, rather than storing $x^{1024}$, the computer may store $y=x^{64}$ and compute in real time $y^6$. So, the total time required to compute $x^{1024}$=cost of memory lookup $y=x^{64}$+cost of computing $y^6$. It was noticed that the smaller the exponent the smaller the computation cost, therefore, the computer may be configured to limit the size of the exponent such that it is efficient to compute the value without occupying a huge disk. Using not more than 2*1328 values, the computer may efficiently perform each of steps 320, 420. This will save disk space as compared to the approach described in the paragraph above. The total stored values may be 2*1328*2*10⁵. The disk space required for approach may be 63 GB.

Analogous to the Diffie-Hellman based protocols (e.g., methods 300, 400), the following optimizations for each of the steps 520 and 620 of the elliptical curve cryptography protocols (e.g., methods 500, 600):

To have a comparable security as of Diffie-Hellman based protocols methods (300, 400), the computer may use 160 bits, e.g., 20 bytes for G. In an embodiment, the computer may precompute all or nearly all possible values in each of the steps 520, 620 and perform a dictionary lookup/memory lookup rather than real time computations. The computer may have to compute for this approach, a total of 2*105*2*105 values, because total possible values of the base are 2*105 (ranging between −9999 and 9999) and similarly total possible values of the exponent are 2*105 (ranging between −9999 and 9999). The disk space/memory required for approach may be 0.8 TB, because each computed value may be 20 bytes.

In another embodiment, the computer may precompute a set of possible values ("smart" possible values) at each of steps 520 and 620 and perform a combination of memory lookups/dictionary lookups and small computations. For e.g. let $a_1=1234$. Therefore, rather than storing 1234x, the computer may store $y_0=xG$, $y_1=2xG$, $y_2=4xG$, $y_3=8xG$, $y_4=16xG$, $y_5=32xG$, $y_6=64xG$, $y_7=128xG$, $y_8=256xG$, $y_9=512xG$, $y_{10}=1024xG$, $y_{11}=2048xG$, $y_{12}=4096xG$, and $y_{13}=8192xG$ and compute in real time $y_{10}+y_7+y_6+y_4+y_1$. So, the total time required by the computer to compute 1234xG may be the cost of memory lookups added to cost of computing the summation. It was found that the summations may be faster than multiplications in elliptical curve cryptography. Therefore, the computer may be configured to limit the multiplications and replace the multiplications with the lookups and summations. Using not more than 14 values, the computer may efficiently perform steps 520, 620. This approach may save disk space compared to the approach described in the above paragraph. The total stored values for this approach may be 9*2*10⁶. The disk space required for this approach may therefore be 230 MB.

Figure 7:
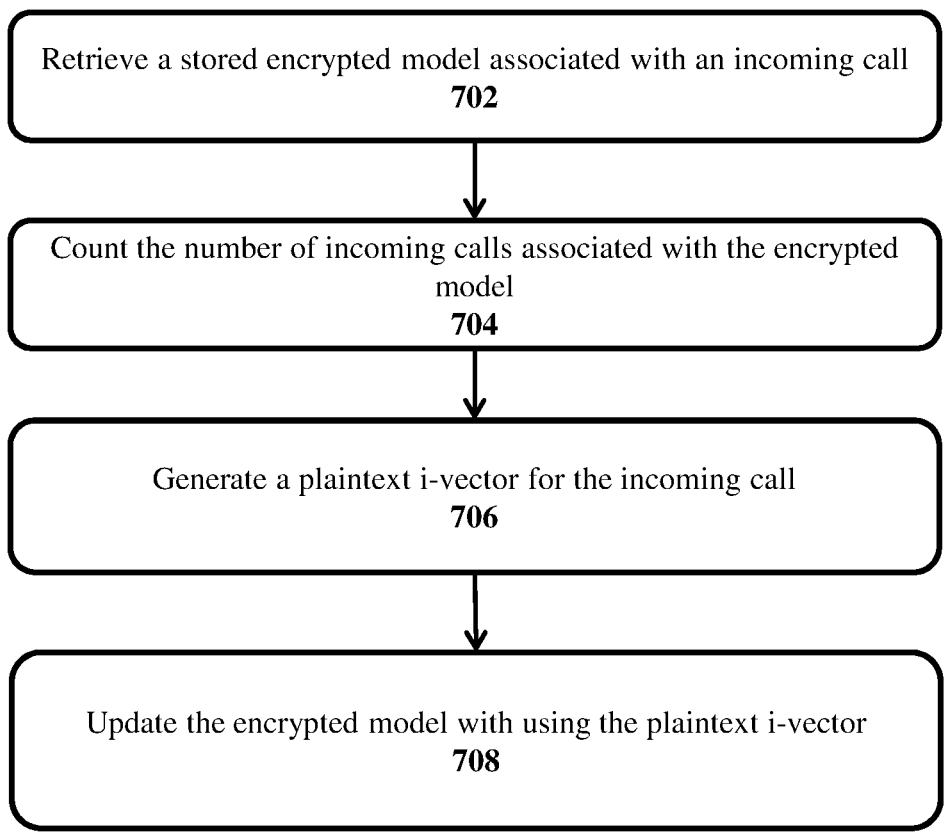
FIG. 7 shows an illustrative method of secure updating of voiceprints, according to an embodiment.

FIG. 7 shows an illustrative method 700 of updating a voiceprint stored as an encrypted i-vector, according to an illustrative embodiment. Although one or more steps of methods may be executed by multiple computers and multiple databases, this description details, for brevity, the steps being performed by a computer. Furthermore, the method steps shown herein are merely illustrative, and additional or alternative steps, and skipping of one or more steps should also be considered within the scope of this disclosure. Additionally, although the following description details i-vectors encrypted using a Diffie-Hellman protocol, other encryption protocols, such as Elliptical Curve Cryptography, should also be considered to be within the scope of this disclosure. Furthermore, the description of voiceprints in terms of i-vectors in the method 700 is merely for an illustration, and other forms vector representation of voiceprints, such as convolutional neural network (CNN) based c-vectors, should be considered within the scope of this disclosure.

The method may begin at step 702, where the computer may retrieve a stored encrypted model associated with an incoming call. To generate an encrypted model from the plaintext i-vector:

$$B = \begin{bmatrix} b_{11} & b_{12} & \cdots & b_{1n} \\ b_{21} & b_{22} & \cdots & b_{2n} \\ \vdots & \vdots & \ddots & \vdots \\ b_{m1} & b_{m2} & \cdots & b_{mn} \end{bmatrix},$$

the computer may use a random value $\alpha_3$ as opposed to multiple random values in the other methods. The encrypted mode, using Diffie-Hellman encoding may be:

$$\begin{bmatrix} g^{b_{11}+\alpha_3} & g^{b_{12}+\alpha_3} & \cdots & g^{b_{1n}+\alpha_3} \\ g^{b_{21}+\alpha_3} & g^{b_{22}+\alpha_3} & \cdots & g^{b_{2n}+\alpha_3} \\ \vdots & \vdots & \vdots & \vdots \\ g^{b_{m1}+\alpha_3} & g^{b_{m2}+\alpha_3} & \cdots & g^{b_{mn}+\alpha_3} \end{bmatrix}$$

At step 704, the computer may count the number of incoming calls associated with the incoming models. For the description below, the computer may have an initiated a counter x, i.e., the computer may have received x calls associated with the above encrypted model.

At step 706, the computer may generate a plaintext i-vector for the incoming call. More particularly, the computer may generate an i-vector $[r_1, r_2, \ldots, r_n]$ for the incoming call.

At step 708, the computer may update the stored encrypted model using the plaintext i-vector. The computer may first compute $[g^{r_1}, g^{r_2}, \ldots, g^{r_n}]$. Using the new call i-vector and the store encrypted vector for a particular user (a first user, for example), the computer may generate $$\left(\frac{g^{b_{11}+\alpha_3}}{g^{\alpha_3}}\right)^x \cdot g^{r_1} = g^{xb_{11}} \cdot g^{r_1}$$
$$= g^{xb_{11}+r_1}$$
$$= g^{v_{11}}$$

The computer may compute the above $v_{11}$ using a lookup dictionary. The final value may be $v_{11}=v_{11}/(x+1)$ and may replace $b_{11}$. The computer may generate the updated model as follows:

$$\begin{bmatrix} g^{v_{11}+\alpha_3} & g^{v_{12}+\alpha_3} & \cdots & g^{v_{1n}+\alpha_3} \\ g^{v_{21}+\alpha_3} & g^{v_{22}+\alpha_3} & \cdots & g^{v_{2n}+\alpha_3} \\ \vdots & \vdots & \vdots & \vdots \\ g^{v_{m1}+\alpha_3} & g^{v_{m2}+\alpha_3} & \cdots & g^{v_{mn}+\alpha_3} \end{bmatrix}$$

Although the aforementioned embodiments describe calculating cosine distances between a pair of i-vectors to evaluate similarities between i-vectors. However, other embodiments may use other methods of calculation of similarities between two vectors.

A computer may compute a Euclidean distance between two i-vectors to evaluate similarity between two i-vectors. The computer may use the following expression to calculate the Euclidean distance between two i-vectors A and B.

$$EucDis(A, B) = \sqrt{|A|^2 + |B|^2}$$
$$= \sqrt{(a_1 - b_1)^2 + (a_2 - b_2)^2 + \cdots + (a_n - b_n)^2}$$
$$= \sqrt{a_1^2 + b_1^2 - 2a_1b_1 + a_2^2 + b_2^2 - 2a_2b_2 + \cdots + a_n^2 + b_n^2 - 2a_nb_n}$$
$$= \sqrt{|A| + |B| - 2(\cos(A, B))}$$
$$= \sqrt{2 - 2(\cos(A, B))}$$

The computer may also derive the Euclidean distance from the cosine distance between the two vectors A and B.

To evaluate the similarity between a pair of i-vectors, the computer may use a perceptron. In machine learning, the perceptron is an algorithm for supervised learning of binary classifiers (functions that can decide whether an input, represented by a vector of numbers, belongs to some specific class or not). It is a type of linear classifier, e.g., a classification algorithm that makes its predictions based on a linear predictor function combining a set of weights with the feature vector. The algorithm may allow for online learning, in that the algorithm may process elements in the training set one at a time. The perceptron may be represented as function that maps its input x (a real valued vector) to an output value $f(x)$ (a single binary value):

$$f(x) = \begin{cases} 1 & \text{if } w.x + b > 0 \\ 0 & \text{otherwise} \end{cases}$$

It can be seen here that $f(x)$ is an extension of a cosine distance function.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
receiving, by a computer from a first client computer, an encrypted voiceprint model and a random number, wherein the random number is encrypted using a public key of the computer;
decrypting, by the computer, the random number using a private key of the computer;
transmitting, by the computer, the encrypted voiceprint model generated by the first client computer to a second client computer;
receiving, by the computer, one or more encrypted comparison models generated by the second client computer based upon comparing the encrypted voiceprint model generated by the first client computer and a plaintext voiceprint generated by the second client computer;
determining, by the computer, a similarity score between the encrypted voiceprint model generated by the first client computer and the plaintext voiceprint generated by the second client computer using the random number on the one or more encrypted comparison models; and
transmitting, by the computer, the similarity score to the second client computer to authenticate a speaker of a voice associated with the plaintext voiceprint or to identify a fraudulent caller.

2. The method of claim 1, wherein the encrypted voiceprint model is encrypted using properties from a Diffie-Hellman key exchange protocol.

3. The method of claim 1, wherein the encrypted voiceprint model is encrypted using properties from an elliptical curve cryptography key exchange protocol.

4. The method of claim 1, wherein determining the similarity score comprises:
retrieving, by the computer, the similarity score from a stored dictionary using the one or more encrypted comparison models.

5. The method of claim 1, further comprising:
receiving, by the computer from the first client computer, an encrypted second random number encrypted using a public key of the second client computer; and
transmitting, by the computer to the second client computer, the second random number, whereby the second client computer decrypts the second random number using a private key of the second client computer and uses the second random number to generate the one or more encrypted comparison models.

6. The method of claim 1, wherein the one or more encrypted comparison models comprise a first matrix and a second matrix.

7. The method of claim 6, wherein determining the similarity score comprises:
dividing, by the computer, the first matrix by the second matrix indexed by the random number.

8. The method of claim 6, wherein determining the similarity score comprises:
subtracting, by the computer, the product of the second matrix with the random number from the first matrix.

9. The method of claim 1, wherein the encrypted voiceprint model comprises a plurality of voiceprints associated with the first client computer.

10. A computer implemented method comprising:
receiving, by a first computer from a third party server, an encrypted voiceprint model generated at a second computer and an encrypted random number encrypted using a public key of the first computer;
decrypting, by the first computer, the random number using a private key of the first computer;
extracting, by the first computer, a plaintext voiceprint from an audio;
generating, by the first computer, one or more encrypted comparison models based upon the encrypted voiceprint model generated at the second computer, the plaintext voiceprint generated at the first computer, and the random number;
transmitting, by the first computer, the one or more encrypted comparison models to the third party server;
receiving, by the first computer from the third party server, a similarity score between the encrypted voiceprint model and the plaintext voiceprint; and
identifying, by the first computer, a speaker of a voice in the audio based on the similarity score or a fraudulent caller.

11. The method of claim 10, wherein the first computer detects the speaker in real-time.

12. The method of claim 10, wherein the encrypted voiceprint model is encrypted using the properties from a Diffie-Hellman key exchange protocol.

13. The method of claim 10, wherein the encrypted voiceprint model is encrypted using the properties from an elliptical curve cryptography key exchange protocol.

14. The method of claim 10, wherein the first computer generates the one or more encrypted comparison models by:
indexing, by the first computer, one or more matrices in the encrypted voiceprint model by the plaintext voiceprint generated from the phone call to generate one or more intermediate matrices; and
multiplying, by the first computer in the intermediate matrices, elements of each row among themselves.

15. The method of claim 14, further comprising:
performing, by the first computer, one or more dictionary lookups in real time to retrieve one or more values of the one or more encrypted comparison models.

16. The method of claim 10, wherein the first computer generates the one or more encrypted comparison models by:
multiplying, by the first computer, one or more matrices in the encrypted voiceprint model by the plaintext voiceprint generated from the phone call to generate one or more intermediate matrices; and
adding, by the first computer in the intermediate matrices, elements of each row among themselves.

17. The method of claim 16, further comprising:
performing, by the first computer, one or more dictionary lookups in real time to retrieve one or more values of the one or more encrypted comparison models.

18. A system comprising:
a non-transitory storage medium configured to store a plurality of encrypted voiceprint models and a lookup table for encrypted similarity scores and corresponding plaintext similarity scores;
a processor coupled to the non-transitory storage medium and configured to:
receive from a first client computer, an encrypted voiceprint model and an encrypted random number, wherein the random number is encrypted using a public key of the computer;
decrypt the random number using a private key of the computer;

transmit the encrypted voiceprint model to a second client computer;

receive one or more encrypted comparison models generated by the second computer based upon comparing the encrypted voiceprint model generated at the first client computer and a plaintext voiceprint generated at the second client computer;

determine an encrypted similarity score between the encrypted voiceprint model generated at the first client computer and the plaintext voiceprint generated at the second client computer using the random number on the one or more encrypted comparison models; and retrieve from the lookup table in the non-transitory storage medium a plaintext similarity score corresponding to the encrypted similarity score.

19. The system of claim 18, wherein the encrypted voiceprint model is encrypted using properties from a Diffie-Hellman key exchange protocol.

20. The system of claim 18, wherein the encrypted voiceprint model is encrypted using properties from an elliptical curve cryptography key exchange protocol.

* * * * *